United States Patent
Fujiwara et al.

(10) Patent No.: US 8,183,514 B2
(45) Date of Patent: May 22, 2012

(54) SIGNAL WAVEFORM MEASURING APPARATUS AND METHOD COMPRISING A WAVELENGTH CONVERSION ELEMENT

(75) Inventors: Hiroyasu Fujiwara, Hamamatsu (JP); Tadashi Kawazoe, Tokyo (JP); Motoichi Ohtsu, Tokyo (JP)

(73) Assignees: Hamamatsu Photonics K.K., Hamamatsu-shi, Shizuoka (JP); The University of Tokyo, Tokyo (JP)

( * ) Notice: Subject to any disclaimer, the term of this patent is extended or adjusted under 35 U.S.C. 154(b) by 458 days.

(21) Appl. No.: 12/550,895

(22) Filed: Aug. 31, 2009

(65) Prior Publication Data

US 2010/0219359 A1    Sep. 2, 2010

(30) Foreign Application Priority Data

Feb. 27, 2009   (JP) ................. P2009-045987

(51) Int. Cl.
 *H03F 3/08* (2006.01)
 *G02F 1/35* (2006.01)
(52) U.S. Cl. .................. 250/214 R; 359/326
(58) Field of Classification Search ............. 250/214.1, 250/214 R, 578.1, 216, 227.23, 227.18, 226; 356/320, 325, 434, 319, 323, 324, 326, 330, 356/331, 332, 4.01, 5.01, 5.03, 121; 359/326–332, 359/238, 278, 287; 372/21, 22
See application file for complete search history.

(56) References Cited

U.S. PATENT DOCUMENTS

| | | | | |
|---|---|---|---|---|
| 3,813,168 A | * | 5/1974 | Honkawa ............... | 356/320 |
| 5,050,988 A | * | 9/1991 | Sugiyama et al. ....... | 356/121 |
| 5,182,666 A | * | 1/1993 | Kawabe .................. | 359/107 |
| 5,585,913 A | * | 12/1996 | Hariharan et al. ...... | 356/4.09 |
| 7,764,421 B2 | * | 7/2010 | Fujiwara et al. ......... | 359/326 |

FOREIGN PATENT DOCUMENTS

| | | |
|---|---|---|
| JP | 60-17049 | 4/1985 |
| JP | 5-74013 | 10/1993 |
| JP | 10-132665 | 5/1998 |
| JP | 2003-13236 | 1/2003 |
| JP | 2003-35602 | 2/2003 |
| JP | 2004-107744 | 4/2004 |
| JP | 2004-235574 | 8/2004 |
| JP | 2007-95859 | 4/2007 |

* cited by examiner

*Primary Examiner* — Francis M Legasse, Jr.
*Assistant Examiner* — Jennifer Bennett
(74) *Attorney, Agent, or Firm* — Drinker Biddle & Reath LLP

(57) ABSTRACT

A signal waveform measuring apparatus 1A is configured from: a signal optical system 11, a reference optical system 16, a time difference setting unit 12 setting a time difference between signal light L1 and reference light L2, a wavelength conversion element 20 including an aggregate of crystals of a dye molecule and generating converted light L5, which has been wavelength-converted to a shorter wavelength than incident light made incident on the crystal aggregate, at an intensity proportional to an r-th power (r>1) of the intensity of the incident light, a photodetector 30 detecting the converted light L5, generated at the element 20 at the intensity that is in accordance with the intensity of the signal light L1, the intensity of the reference light L2, and the time difference between the two, and a signal waveform analyzer 40 performing analysis of the detection result of the converted light L5 and thereby acquiring a time waveform of the signal light L1. A signal waveform measuring apparatus and a measuring method that enable a time waveform of signal light to be measured with good precision by a simple configuration are thereby realized.

13 Claims, 18 Drawing Sheets

(a)

(b)

(a)

(b)

(c)

(a)

(b)

(c)

(a)

(b)

(a)

(b)

SIGNAL WAVEFORM MEASURING APPARATUS AND METHOD COMPRISING A WAVELENGTH CONVERSION ELEMENT

BACKGROUND OF THE INVENTION

1. Field of the Invention

The present invention relates to a signal waveform measuring apparatus and a signal waveform measuring method for measuring a time waveform of signal light.

2. Related Background Art

As methods for measuring a time waveform of pulsed signal light, an optical sampling method and a measuring method using a streak camera are conventionally known (see Patent Documents 1 to 4). In the optical sampling method, sum frequency generation or difference frequency generation by a nonlinear optical crystal is utilized to measure the time waveform of the signal light subject to measurement. With the method using the streak camera, electrons resulting from photoelectric conversion of the signal light are time-swept electrically to measure the time waveform of the signal light.

Patent Document 1: Japanese Patent Application Laid-Open No. 2003-35602
Patent Document 2: Japanese Patent Publication No. H5-74013
Patent Document 3: Japanese Patent Application Laid-Open No. H10-132665
Patent Document 4: Japanese Patent Publication No. S60-17049
Patent Document 5: Japanese Patent Application Laid-Open No. 2007-95859
Patent Document 6: Japanese Patent Application Laid-Open No. 2004-235574
Patent Document 7: Japanese Patent Application Laid-Open No. 2003-13236
Patent Document 8: Japanese Patent Application Laid-Open No. 2004-107744

SUMMARY OF THE INVENTION

Among the abovementioned measuring methods, with the measurement of the time waveform using the optical sampling method, in order to meet phase matching conditions inside the nonlinear optical crystal, polarization directions of the signal light and sampling light must be adjusted and an incidence angle of light on the crystal or an orientation of the crystal must be adjusted in accordance with the wavelength of the signal light subject to measurement, etc. Such a measuring method thus has a problem in that measurement work thereof and configurations of adjusting mechanisms in a measuring apparatus are complex.

Also, with the optical sampling method, for example in a case where the time waveforms of signal light that contains information of multiple wavelengths are to be measured, a mechanism that changes the orientation of the nonlinear crystal according to each measurement wavelength is necessary, and the configuration for measurement is thus complex and a long time is required for measurement. Further, in a case of measurement using difference frequency generation, because difference frequency light that has been wavelength-converted (frequency-converted) is weak in intensity, the signal light intensity must be made high by optical amplification, etc., to maintain an adequate S/N ratio in the measurement of the time waveform. However, in general, an optical amplifier is narrow and fixed in amplification wavelength band, and there is thus a problem that the configuration of the measuring apparatus must be changed according to each wavelength of the signal light.

Besides sum frequency generation and difference frequency generation by a nonlinear optical crystal, a time waveform measuring method that makes use, for example, of two-photon absorption emission may be considered. However, with the method using such two-photon absorption, the excitation process takes place via a virtual level, and there is thus a problem that the signal light intensity must be made high as in the case described above or an adequate measurement precision cannot be obtained in the time waveform measurement.

With time waveform measurement using the streak camera, the time waveform is measured by electrically sweeping as mentioned above, and there is thus a possibility of occurrence of variation (jitter) of the deviation between the incidence timing of the signal light and the timing of the time sweep, and this may lead to degradation of the precision and resolution of the signal waveform measurement. Further, apparatus portions, such as a photoelectric conversion unit, time sweeping unit, etc., for the signal light subject to measurement are integrally formed inside a vacuum tube, and there is thus a problem that the apparatus configuration is complex.

The present invention has been made to resolve the above problems, and an object thereof is to provide a signal waveform measuring apparatus and a signal waveform measuring method that enable a time waveform of signal light to be measured with good precision by a simple configuration.

The present inventors have recently found that when an element in which an aggregate of crystals (crystal aggregate) of a dye molecule is held by a crystal holding unit is irradiated with light, converted light that includes a wavelength component of a shorter wavelength than the incident light is generated by special properties of near-field light, which is an electromagnetic wave that leaks out near a surface of a substance (see, for example, Patent Documents 5 to 8), and are carrying out detailed examination of characteristics, applications, etc., of such a wavelength conversion element.

In the examination of such an element, it is becoming clear that although the emission intensity of the converted light in the crystal aggregate normally varies linearly with respect to (is proportional to a first power of) the intensity of the incident light, when conditions, such as the type of a dye molecule used for the wavelength conversion, are changed, the emission intensity of the converted light becomes proportional to an r-th power ($r>1$) (for example, proportional to a second power) of the intensity of the incident light under certain conditions. The present inventors found that a time waveform of signal light can be measured at high precision by utilizing such a wavelength conversion phenomenon and the characteristics thereof and thereby arrived at the present invention.

That is, a signal waveform measuring apparatus according to the present invention includes: (1) a signal optical system guiding pulsed signal light that is to be subject to measurement of a time waveform; (2) a reference optical system guiding reference light used in measuring the time waveform of the signal light; (3) a time difference setting unit disposed at least in one of either the signal optical system or the reference optical system and setting a time difference between the signal light and the reference light; (4) a wavelength conversion element including an aggregate of crystals of a dye molecule and generating converted light, which has been wavelength-converted to a shorter wavelength than incident light made incident on the dye molecule crystal aggregate, at an intensity proportional to an r-th power ($r>1$) of the intensity of the incident light; (5) a photodetecting unit detecting the converted light, which is generated at the wavelength conversion element by the incidence of the signal light from the signal optical system and the reference light from the reference optical system and at the intensity that is in accordance with the intensity of the signal light, the intensity of the reference light, and the time difference between the two; and (6) a signal waveform analyzing unit performing analysis of the converted light detection result at the photodetecting unit and thereby acquiring the time waveform of the signal light.

A signal waveform measuring method according to the present invention includes: (1) a signal light guiding step of guiding, by a signal optical system, pulsed signal light that is to be subject to measurement of a time waveform; (2) a reference light guiding step of guiding, by a reference optical system, reference light used in measuring the time waveform of the signal light; (3) a time difference setting step of setting a time difference between the signal light and the reference light in at least one of either the signal optical system or the reference optical system; (4) a wavelength conversion step of using a wavelength conversion element, including an aggregate of crystals of a dye molecule, to generate converted light, which has been wavelength-converted to a shorter wavelength than incident light made incident on the dye molecule crystal aggregate, at an intensity proportional to an r-th power (r>1) of the intensity of the incident light; (5) a photodetecting step of detecting the converted light, which is generated at the wavelength conversion element by the incidence of the signal light from the signal optical system and the reference light from the reference optical system and at the intensity that is in accordance with the intensity of the signal light, the intensity of the reference light, and the time difference between the two; and (6) a signal waveform analyzing step of performing analysis of the converted light detection result at the photodetecting step and thereby acquiring the time waveform of the signal light.

In the above-described signal waveform measuring apparatus and measuring method, the element that includes the crystal aggregate, in which a plurality of crystals of the dye molecule are put in a state of being in proximity of each other, is used as the wavelength conversion element. When light of a predetermined wavelength, for example, light of a wavelength, which is longer than an absorption edge of the dye molecule and by which electron level is not excited, is made incident on such a wavelength conversion element, near-field light is generated near a surface of the dye molecule crystal on which the light is made incident.

In this process, by a steep electric field gradient of the near-field light, a vibrational level (phonon) is excited in the dye molecule inside the crystal near the irradiated crystal and the converted light that includes a wavelength component of a shorter wavelength (energy component of higher energy) than the incident light is generated. Thus, with such a configuration where the dye molecule crystal aggregate is used as a wavelength conversion medium, by use of the near-field light, wavelength conversion that generates the converted light, which is of a shorter wavelength than the incident light and is not generated by luminescence generation by electron level excitation in a normal absorption process, is realized.

Furthermore, in such a configuration, the wavelength conversion element is configured in the condition of generating the converted light at the intensity proportional to the r-th power (r>1) of the intensity of the incident light, and the signal light and the reference light, the mutual time difference of which is set and controlled by the time difference setting unit, are made incident on the wavelength conversion element. In this process, due to the state of temporal overlap of the signal light pulse and the reference light pulse, the converted light is generated at the wavelength conversion element and at the intensity that is in accordance with the intensity of the signal light, the intensity of the reference light, and the time difference between them. The time waveform of the signal light can then be acquired by analyzing the detection result of the converted light with reference to the information on the time difference of the signal light and the reference light. Thus, by such a configuration, the signal waveform measuring apparatus and measuring method that enable the time waveform of the signal light to be measured with good precision by a simple and inexpensive configuration are realized.

According to the above-described signal waveform measuring apparatus and measuring method, by making the signal light and the reference light, with which a time difference is set with respect to each other, incident on the wavelength conversion element, including the dye molecule crystal aggregate and being configured in the condition of generating the converted light at the intensity proportional to the r-th power (r>1) of the intensity of the incident light, then detecting the converted light, which is generated at the intensity in accordance with the intensity of the signal light, the intensity of the reference light, and the time difference between the two, and analyzing the detection result and thereby acquiring the time waveform of the signal light, the signal waveform measuring apparatus and measuring method that enable the time waveform to be measured with good precision by a simple configuration are realized.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
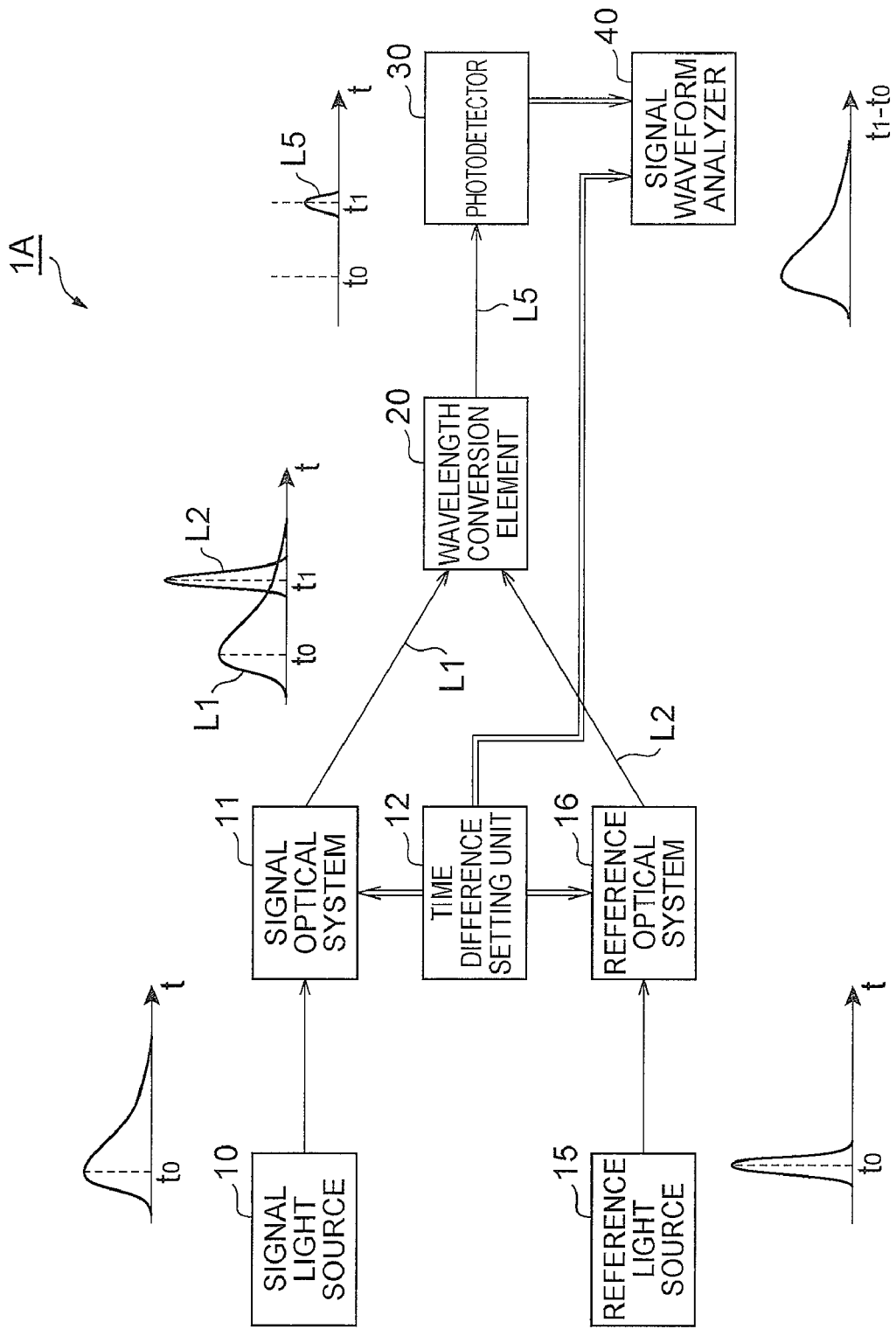
FIG. 1 is a diagram of a configuration of an embodiment of a signal waveform measuring apparatus.

Preferred embodiments of the signal waveform measuring apparatus and the signal waveform measuring method according to the present invention shall now be described in detail along with the drawings. In the description of the drawings, elements that are the same are provided with the same symbols and overlapping description shall be omitted. Also, dimensional proportions in the drawings do not necessarily match those of the description.

FIG. 1 is a diagram of a configuration of an embodiment of a signal waveform measuring apparatus according to the present invention. With the present measuring apparatus, pulsed signal light, which is to be subject to measurement, and reference light are made incident on a wavelength conversion element and a time waveform of the signal light is acquired based on a detection result of converted light generated in the wavelength conversion element. Here, although examples where the signal light and the reference light, which are to become the incident light on the wavelength conversion element, are near-infrared light and the converted light is visible light shall mainly be described below, the signal waveform measuring apparatus and measuring method according to the present invention are not restricted to such wavelength bands. In the following, the configuration of the present signal waveform measuring apparatus 1A shall be described along with a signal waveform measuring method.

Figure 2:
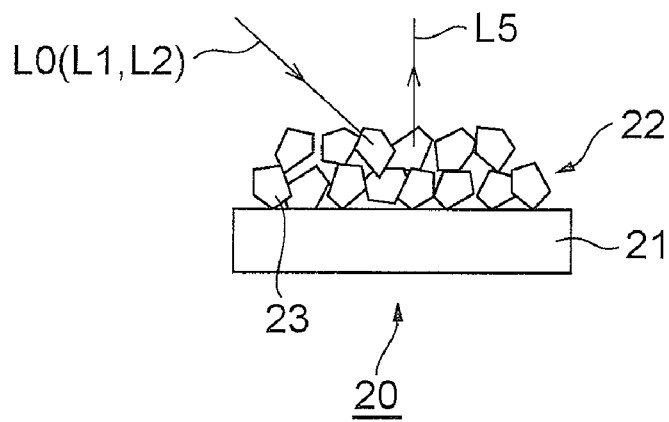
FIG. 2 shows diagrams of a wavelength conversion element used in the signal waveform measuring apparatus.
Figure 2:
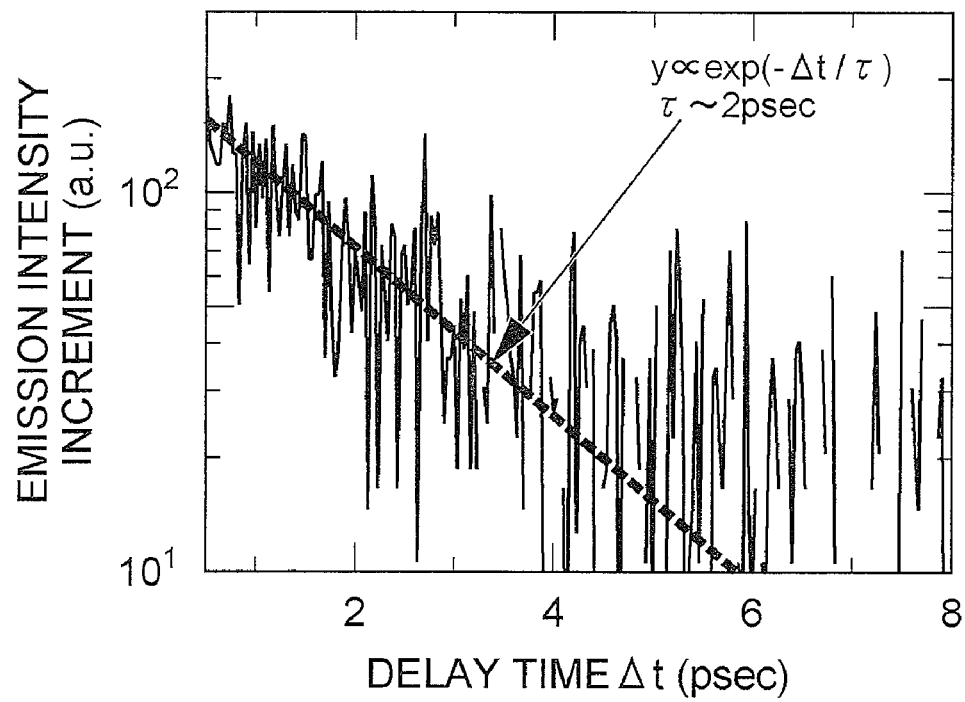

The signal waveform measuring apparatus 1A shown in FIG. 1 includes a signal optical system 11, a reference optical system 16, a time difference setting unit 12, a wavelength conversion element 20, a photodetector 30, and a signal waveform analyzer 40. FIG. 2 shows diagrams of the wavelength conversion element 20 used in the signal waveform measuring apparatus 1A.

The wavelength conversion element 20 is an element used for wavelength conversion (frequency conversion) from incident light L0 (signal light L1 and reference light L2, to be described below) to converted light L5 and includes a holding substrate 21 and an aggregate 22 of crystals of a dye molecule as shown in (a) in FIG. 2. The dye molecule crystal aggregate (hereinafter, referred to simply as "crystal aggregate" at times) 22 is a wavelength conversion medium, which actually performs the wavelength conversion of light in the element 20 and in which a plurality of dye molecule crystals (crystal grains) 23 are aggregated in a mutually proximate state. The holding substrate 21 is a crystal holding unit that holds the crystal aggregate 22. In the configuration example of FIG. 2(a), the substrate 21 is disposed horizontally and the crystal aggregate 22 is held on an upper surface of the substrate 21.

With respect to the incident light L0 on the crystal aggregate 22, the wavelength conversion element 20 generates and outputs the converted light L5 that is wavelength-converted to a shorter wavelength than the incident light L0. Also, the wavelength conversion element 20 in the present embodiment is configured so that an intensity of the converted light L5 generated is proportional to an r-th power ($r>1$, that is higher in order than a first order) of the intensity of the incident light L0 on the crystal aggregate 22.

For the wavelength conversion element 20 are disposed the signal optical system 11, which guides the pulsed signal light L1 supplied from a signal light source 10 and is to be subject to the measurement of the time waveform, and the reference optical system 16, which guides the pulsed reference light L2 supplied from a reference light source 15 and is used in the measurement of the time waveform of the signal light L1.

The time difference setting unit 12 is provided for the optical systems 11 and 16. The setting unit 12 is disposed in at least one of either the signal optical system 11 or the reference optical system 12 and is a setting unit that sets a time difference between the signal light L1 and the reference light L2. The setting and changing of such a time difference are performed as necessary to measure the time waveform of the signal light L1. A method for setting the time difference shall be described specifically below.

As each of the signal light L1 and the reference light L2 that are to become the incident light L0 on the wavelength conversion element 20, light (for example, near infrared light) of a wavelength longer than an absorption edge of the dye molecule used in the crystal aggregate 22 of the element 20 is preferably used. In such a configuration, the signal light L1 guided by the signal optical system 11 (signal light guiding step) and the reference light L2 guided by the reference optical system 16 (reference light guiding step) are made incident on the wavelength conversion element 20 in a state in which the time difference between the two is set and controlled by the time difference setting unit 12 (time difference setting step).

Here, if, as mentioned above, the wavelengths of the signal light L1 and the reference light L2 are respectively set to wavelengths longer than the absorption edge of the dye molecule, that is, to wavelengths that are not absorbed by the dye molecule, electron level excitation by a normal absorption process and an accompanying generation of luminescence do not occur in the dye molecule of the crystal aggregate 22 even when the crystal aggregate 22 of the wavelength conversion element 20 is irradiated with the signal light L1 and the reference light L2.

In the wavelength conversion element 20, by the incidence of the near-infrared signal light L1 and reference light L2 on the dye molecule crystal aggregate 22 held on the holding substrate 21, the converted light L5 (for example, visible light) that has been wavelength-converted to a shorter wavelength than the incident light is generated (wavelength conversion step). As shall be described in detail below, such wavelength conversion of light from near-infrared light to visible light is performed by utilizing properties of near-field light generated inside the crystal aggregate 22. Also, the intensity of the converted light L5 generated in the wavelength conversion element 20 is in accordance not only with the intensity of the signal light L1 and the intensity of the reference light L2 but also with a time difference $t_1-t_0$ between an incidence timing $t_0$ of the signal light L1 on the element 20 and an incidence timing $t_1$ of the reference light L2.

A photodetector 30 and a signal waveform analyzer 40 are provided for the converted light L5 thus generated at and output from the wavelength conversion element 20. The photodetector 30 detects the converted light L5 generated at and output from the wavelength conversion element 20 in accordance with the incidence of the signal light L1 and the reference light L2 as described above and outputs a detection signal that indicates the detection result (photodetecting step).

Information (detection signal) on the detection result of the converted light L5 is input from the photodetector 30 into the signal waveform analyzer 40. Information on the time difference setting in the time difference setting unit 12 is also input into the analyzer 40. The signal waveform analyzer 40 performs the necessary analysis on the information and acquires a time waveform of the signal light L1 (signal waveform analyzing step). Such an analyzer 40 can be realized, for example, by a computer that executes a predetermined analysis program.

For the sake of description, a graph of a time waveform of the signal light L1, a graph of a time waveform of the reference light L2, a graph showing the time waveforms and the time difference of the signal light L1 and the reference light L2 at the stage of incidence on the wavelength conversion element 20, a graph of a time waveform of the converted light L5 detected at the photodetector 30, and a graph of the time waveform of the signal light L1 that is acquired and reconstructed at the signal waveform analyzer 40 are illustrated schematically together with the configuration of the above-described apparatus in FIG. 1. With these graphs, in regard to the setting of the time difference by the time difference setting unit 12, a case of measuring the time waveform with a delay time not being applied to the signal light L1 in the signal optical system 11 but with a delay time of $t_1-t_0$ being applied to the reference light L2 in the reference optical system 16 is illustrated as an example. In regard to the illustration of the graphs, the same applies to the respective figures showing apparatus configurations that follow.

Effects of the signal waveform measuring apparatus and measuring method according to the above-described embodiment shall now be described.

In the signal waveform measuring apparatus 1A shown in FIG. 1 and the measuring method, the element, in which the crystal aggregate 22 of the plurality of dye molecule crystals 23 in a mutually proximate state is held by the holding substrate 21, is used as the wavelength conversion element 20. When light of a predetermined wavelength, for example, the light L0, which is of a longer wavelength (lower energy) than the absorption edge of the dye molecule and with which electron level is not excited by a normal absorption process, is made incident on the wavelength conversion element 20, near-field light is generated near the surfaces of the dye molecule crystals 23 on which the light L0 is made incident.

In this process, by a steep electric field gradient of the near-field light, a molecular vibrational level (phonon) is excited in the dye molecule inside the crystal located near the irradiated crystal and the converted light L5, including a component of a shorter wavelength (component of higher energy) than the incident light L0, is generated. Thus, with the configuration where the dye molecule crystal aggregate 22 is used as the wavelength conversion medium, by use of the near-field light, wavelength conversion that generates the converted light L5, which is of a shorter wavelength than the incident light L0 and is not generated by luminescence generation by electron level excitation in a normal absorption process, is realized.

With this configuration, because the light of a wavelength longer than the absorption edge of the dye molecule can be used as the incident light L0, photodegradation of the dye molecule is unlikely to occur and degradation of the wavelength conversion element 20 is extremely low. Also, because the emission process utilizes the energy of the incident light L0, decrease of emission intensity does not occur even when irradiation of the light L0 is continued. Such an emission phenomenon is presumed to differ from conventionally known phenomena such as wavelength conversion by multiphoton absorption of the incident light L0 or nonlinear optical effect, and also anti-Stokes shift in Raman scattering.

Furthermore, with the measuring apparatus 1A shown in FIG. 1, in the configuration using such a wavelength conversion element 20, the element 20 is configured in conditions in which the converted light L5 is generated at the intensity proportional to the r-th power (r>1) of the intensity of the incident light L0, and the signal light L1 and the reference light L2, with which the mutual time difference is set and controlled by the time difference setting unit 12, are made incident on the element 20. Here, due to the state of temporal overlap of the signal light pulse and the reference light pulse, the converted light L5 is generated at the element 20 and at the intensity that is in accordance with the intensity of the signal light L1, the intensity of the reference light L2, and the time difference between the two.

In regard to the detection result of the converted light L5 detected by the photodetector 30, the time waveform of the signal light L1 can be acquired by analysis at the signal waveform analyzer 40 in reference to the information on the time difference (delay time $t_1-t_0$) that is set between the signal light L1 and the reference light L2. A signal waveform measuring apparatus and a measuring method that enable the time waveform of the signal light L1 to be measured with good precision by a simple and inexpensive configuration are thus realized by the above-described configuration.

With such a configuration, mechanisms, such as mechanisms for adjusting an incidence angle of light, a direction of the crystals, etc., are few in comparison, for example, to a measuring method using a nonlinear optical crystal, and the time waveform of the signal light can thus be acquired by a simple configuration with a low number of parts. In comparison to a method using a streak camera, measurement of high precision and resolution is enabled because generation of timing deviation of measurement is suppressed. Also, with the above-described configuration, high-speed response is not required in the detection of the converted light L5 by the photodetector 30. A general-use product, such as a CCD camera, can thus be used as the photodetector 30 to thereby reduce the apparatus cost.

As mentioned above, in the signal waveform measuring apparatus 1A with the above-described configuration, preferably, each of the signal light L1 and the reference light L2 is light of a wavelength longer than the absorption edge of the dye molecule in the wavelength conversion element 20. The generation of the converted light L5 in the wavelength conversion element 20 and the measurement of the time waveform of the signal light L1 thereby can thus be executed favorably. Also in regard to the incidence of the signal light L1 and the reference light L2 on the wavelength conversion element 20, preferably, a light coupling unit that couples and then makes the signal light L1 and the reference light L2 incident on the element 20 is disposed.

Also, the wavelength conversion element 20 is preferably configured in conditions in which the converted light L5 is generated at the intensity proportional to the r-th power ($r \geq 2$, second order or higher) of the intensity of the incident light L0. Although in the measurement of the time waveform of the signal light L1 using the wavelength conversion element 20, acquisition of the time waveform is possible as long as conditions are such that the converted light intensity is proportional to the r-th power (r>1) of the incident light intensity as described above, acquisition of the time waveform can be performed reliably in particular by performing the measurement under conditions where the converted light intensity is proportional to the r-th power (r≧2) of the incident light intensity, for example, under conditions where the converted light intensity is proportional to the square of the incident light intensity. Such conditions can be set and adjusted according to the wavelength of the signal light L1, the wavelength of the reference light L2, and the selection of the dye molecule of the wavelength conversion element 20 with respect to the signal light L1 and the reference light L2, and the like.

The generation of the converted light L5 in the wavelength conversion element 20 and the acquisition of the time waveform of the signal light L1 shall now be described more specifically. In the configuration using the dye molecule crystal aggregate 22 (see (a) in FIG. 2) for wavelength conversion, a spatially steep electric field gradient due to the near-field light is formed in accordance with the crystal size near the surface of the crystal 23 as described above and a high vibrational level within an electronic ground state is excited in the dye molecule in the crystal nearby. By using such an effect, the converted light L5 of shorter wavelength than the incident light L0 can be generated through a process in which, for example, electrons that are excited to a vibrational level by the incident light L0 are excited to an excited state by further light absorption, etc. In this case, the crystal 23 of the dye molecule has functions of both a source of generation of near-field light accompanying the incidence of the incident light L0 and a center of generation of the converted light L5 due to the near-field light.

In the wavelength conversion using such an element 20, a configuration where near-infrared light is used as the incident light L0 (signal light L1 and reference light L2) and the converted light L5 is visible light may be used as in the example described above. In this case, in regard to the specific wavelength bands of the incident light L0 and the converted light L5, a configuration where the incident light L0 is near-infrared light having a wavelength in a range of 750 nm to 2 µm, and the converted light L5 is visible light having a wavelength in a range of 400 nm to 750 nm may be considered.

In a specific example of observing the wavelength conversion in a case where the incident light L0 is near-infrared light of a wavelength of 750 nm to 800 nm and DCM (CAS No.: 51325-91-8) is used as the dye molecule, dye emission at a wavelength band of 650 nm was observed as the short-wavelength converted light L5. The emission intensity of the converted light L5 in this case varied linearly with respect to the intensity of the incident light.

On the other hand, observation of the wavelength conversion in a likewise manner using a dye molecule with a shorter luminescence wavelength (luminescence wavelength: 460 nm to 540 nm) than the abovementioned DCM showed the emission intensity of the converted light L5 in the wavelength band of 460 nm to 540 nm to be proportional to the square of the incident light intensity. In this case, it is considered that a wavelength conversion phenomenon, in which the converted light intensity is proportional to the square of the incident light intensity, is occurring due to vibrational level excitation of two stages by the near-field light in the dye molecule. A wavelength conversion phenomenon that accompanies vibrational level excitation of three or more stages may also occur in a likewise manner.

The signal waveform measuring apparatus 1A and measuring method according to the present invention utilizes such a wavelength conversion phenomenon to acquire the time waveform. That is, the wavelength conversion element 20, which is configured so that, by the wavelength conversion phenomenon accompanying phonon excitation of two or more stages, the intensity of the converted light L5 generated is proportional to the r-th power (r>1, that is higher order than the first order) of the intensity of the incident light L0 on the crystal aggregate 22, is used, and the signal light L1 and the reference light L2 are made incident on the element 20 at the time difference $t_1 - t_0$ (see FIG. 1). In this case, the converted light L5 is generated at the emission intensity that is in accordance with the state of temporal overlap of the signal light L1 and the reference light L2 at the time of incidence on the element 20.

When under such a condition, a measurement is made upon varying the time difference between the signal light L1 and the reference light L2 in time or in space, the state of temporal overlap of the two varies and the emission intensity of the converted light L5 generated in the wavelength conversion element 20 also varies according to the time difference. That is, in the case where both the signal light L1 and the reference light L2 are overlapped in time, a phonon excitation of a first stage occurs due to the near-field light generated by the photons of the signal light L1, in addition, a phonon excitation of a second stage occurs due to the near-field light generated by the photons of the reference light L2, and the emission intensity of the converted light L5 thus becomes higher than in the case where there is not temporal overlap of the signal light L1 and the reference light L2. Thus, by measuring the emission intensity of the converted light L5 while varying the time difference, the time waveform of the signal light L1 can be acquired as shown schematically in FIG. 1.

By such a time waveform acquiring method, even when the central wavelengths of the signal light L1 and the reference light L2 are changed, the time waveform of the signal light L1 can be measured over a wide wavelength range with the same conditions and configuration and without having to change the angle of incidence of the light on the crystal aggregate 22 of the wavelength conversion element 20 and the like. Also, even in a case where light of a wavelength for which the photodetector 30 is low in detection sensitivity is the signal light L1 that is subject to measurement, the time waveform of the signal light L1 can be measured with good precision by utilizing the wavelength conversion by dye emission.

Also, in the above-described wavelength conversion phenomenon, the vibrational levels of the dye molecule to which excitation by near-field light occurs are not virtual levels but are actual levels. Thus, in comparison, for example, to two-photon absorption emission, in which excitation occurs via a virtual level, the excitation intensity and accordingly the emission intensity of the converted light L5 are high in the above-described phonon excitation of two stages or more, and the time waveform of the signal light L1 can thus be measured with good precision.

Here, a graph in (b) in FIG. 2 shows a result of making a measurement concerning a vibrational level, which is an intermediate level, by pump probe measurement using femtosecond pulsed light. The measurement result shows that the vibrational level which is excited due to near-field light is an actual level with a finite lifetime of approximately 2 psec and not a virtual level as in the case of two-photon absorption, etc.

Also, as can be understood from the above-described wavelength conversion phenomenon, when ω1 is a frequency of the signal light L1 that is to be the incident light L0 on the wavelength conversion element 20, ω2 is a frequency of the reference light L2, and ω5 is a frequency of the converted light L5 generated in the element 20, the frequencies preferably satisfy a magnitude relationship of the following formula:

$$\omega1, \omega2 < \omega5 < \omega1 + \omega2 + \omega2$$

Here, the frequency ω5 of the converted light L5 is determined by the type of the dye molecule used in the wavelength conversion element 20.

As specific examples of the dye molecule used in the crystal aggregate 22 that is the wavelength conversion medium in the wavelength conversion element 20, Coumarin 480 (CAS No.: 41267-76-9), Coumarin 540A (CAS No.: 53518-18-6), and Stilbene 420 (CAS No.: 27344-41-8) may be used. Various other dye molecules may be used as the wavelength conversion medium.

In regard to the dye molecule of the crystal aggregate 22, the dye molecule crystals 23 contained in the crystal aggregate 22 are preferably crystal grains having a shape with a width no more than 1 μm and a length no more than 10 μm. With this configuration, generation efficiency of the converted light L5 by wavelength conversion utilizing the near-field light generated near the surfaces of the dye molecule crystals 23 on which the signal light L1 and the reference light L2 are made incident and accordingly, measurement efficiency of the time waveform of the signal light L1 can be improved.

As a specific method of preparation of the wavelength conversion element 20, for example, the following preparation method may be used. In this preparation method, first, the dye molecule is completely dissolved in acetone. The quantity of solution in this case is, for example, 1 cc of acetone with 40 mg of Coumarin 540A. When 1 cc of such a solution is mixed with 1.0 cc of water, the Coumarin 540A dye molecule crystallizes and precipitates. By then dripping the precipitated dye molecule crystals onto a substrate or into a cell to be used as the crystal holding unit, the wavelength conversion element 20, in which the Coumarin 540A crystal aggregate is held by the holding unit, is obtained.

In regard to the material of the crystal holding unit of the wavelength conversion element 20, for example, synthetic quartz can be used favorably. In regard to the form of the crystal holding unit, a synthetic quartz substrate with a predetermined thickness (for example, a thickness of 1 mm) or a synthetic quartz cell with a predetermined optical path length (for example, an optical path length of 1 mm) can be used favorably.

In regard to the supplying of the pulsed signal light L1 that is to be subject to measurement of the time waveform, although a configuration in which the signal light source 10 is provided for the signal optical system 11 is shown as an example in the measuring apparatus 1A shown in FIG. 1, the present invention is not restricted to such a configuration, and the signal light L1 that is to be subject to measurement may be supplied from an exterior of the apparatus. Also in regard to the reference light L2 that is used in the measurement of the time waveform, although the measuring apparatus 1A shown in FIG. 1 has a configuration equipped with the reference light source 15 for supplying the reference light, as with the signal light L1, the reference light L2 may be supplied from an exterior of the apparatus.

Figure 3:
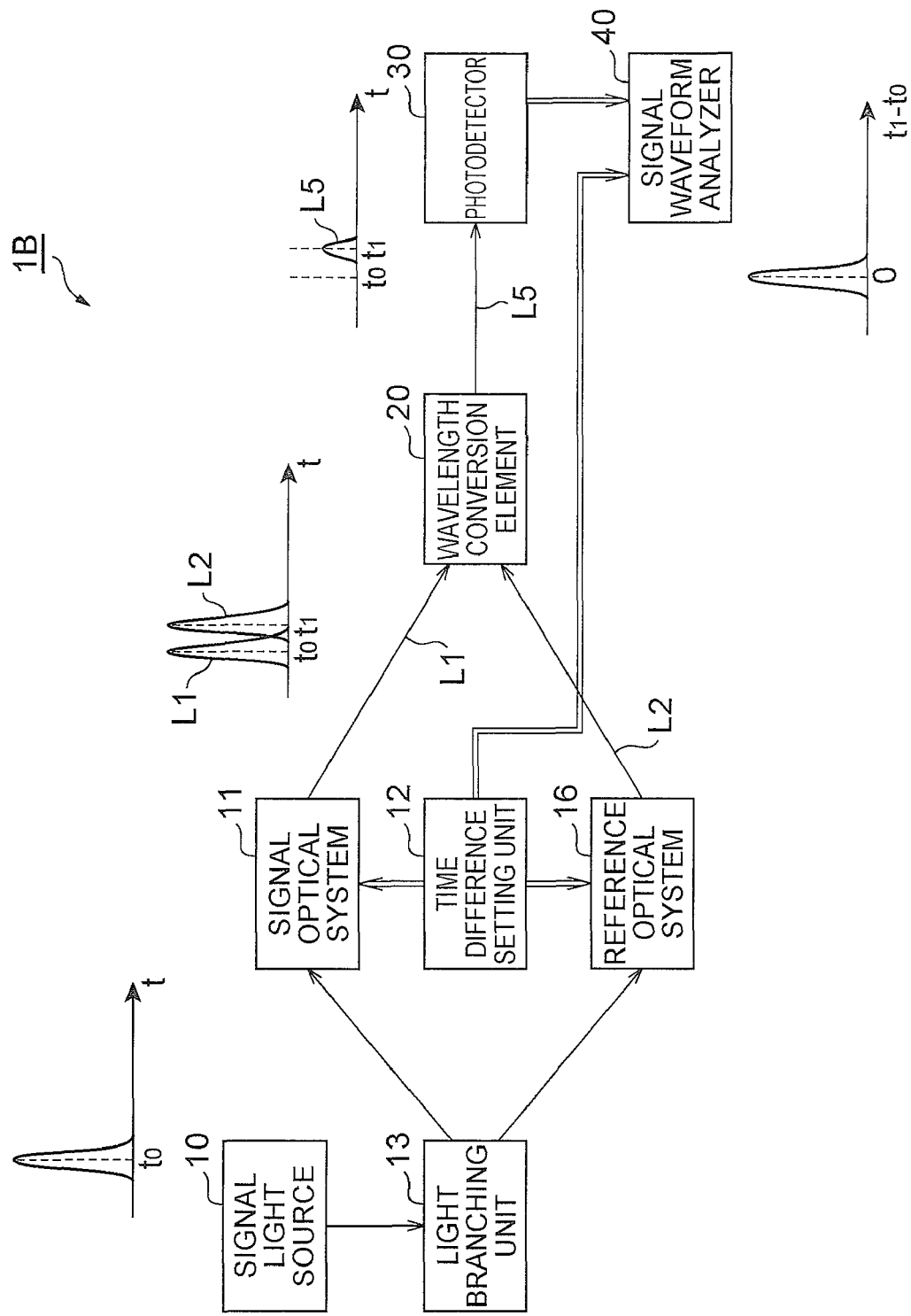
FIG. 3 is a diagram of a configuration of another embodiment of a signal waveform measuring apparatus.

Also, in regard to the supplying of the reference light L2, the present invention is not restricted to a configuration where the light supplied from the reference light source 15, disposed apart from the signal light source 10, is used as the reference light L2 as described above, and a configuration where a portion of the signal light L1 is branched and used as the reference light L2 is also possible. FIG. 3 is a diagram of a configuration of another embodiment of a signal waveform measuring apparatus. In regard to the signal optical system 11, the reference optical system 16, the time difference setting unit 12, the wavelength conversion element 20, the photodetector 30, and the signal waveform analyzer 40, the configuration of the signal waveform measuring apparatus 1B shown in FIG. 3 is the same as the configuration of the measuring apparatus 1A shown in FIG. 1.

In the present embodiment, a light branching unit 13 for branching a portion of the signal light and thereby generating the reference light, is provided for the signal light source 10. One light component that is branched by the light branching unit 13 is guided as the signal light L1 by the signal optical system 11, and the other light component is guided as the reference light L2 by the reference optical system 16. Even with such a configuration, the time waveform of the signal light L1 can be measured favorably.

In regard to the configuration of the wavelength conversion element 20, the configuration where the dye molecule crystal aggregate 22 is held by the crystal holding unit as described above is preferable. It is especially preferable to use the configuration where the substrate (member of substrate form) 21 is used as the crystal holding unit and the crystal aggregate 22 is held on one surface of the substrate 21 as shown in FIG. 2. The element 20 having the crystal aggregate 22 as the wavelength conversion medium can thereby be configured favorably. In regard to the specific configuration of the wavelength conversion element 20, various configurations may be used as shown in FIGS. 4 to 7. In FIGS. 4 to 7 below, illustration of the dye molecule crystal aggregate 22 is simplified.

Figure 4:
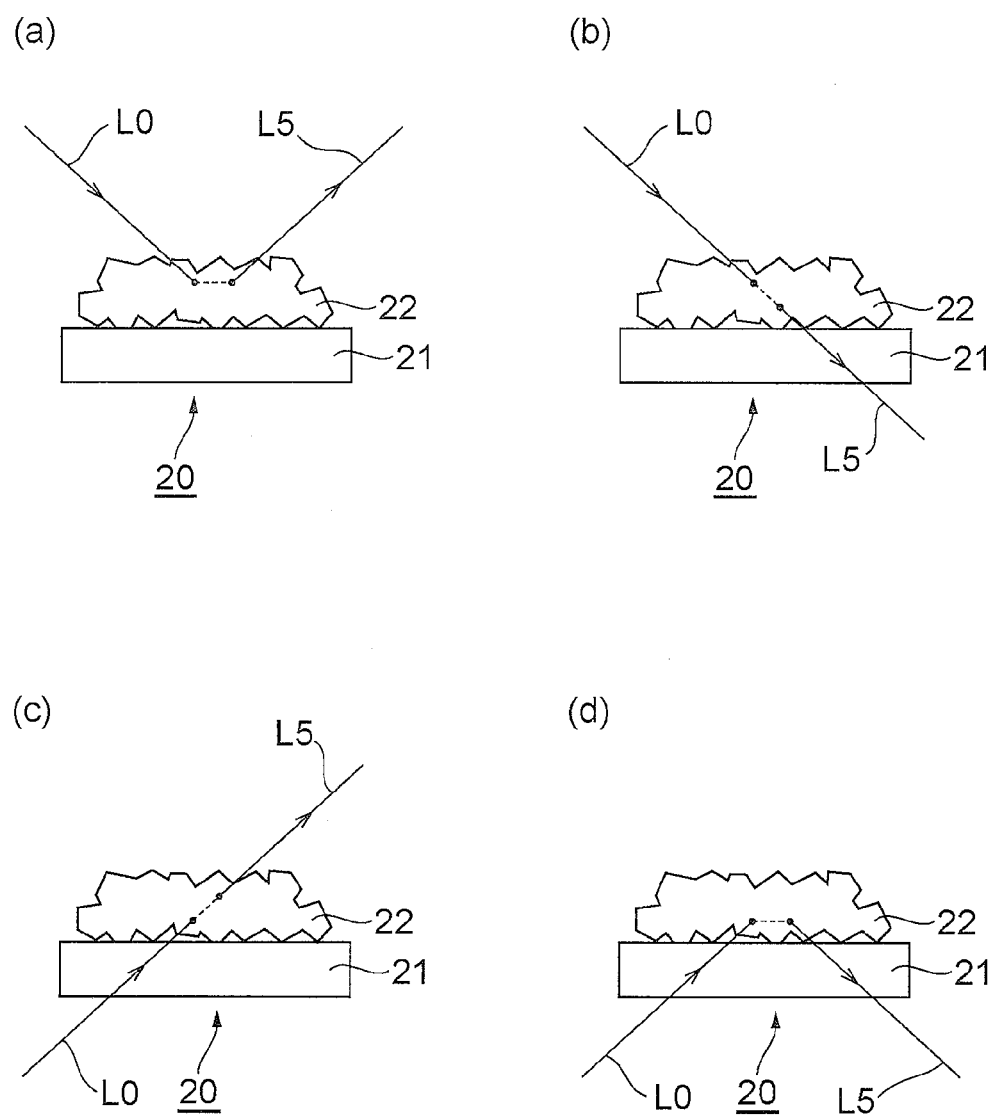
FIG. 4 shows diagrams of configuration examples of the wavelength conversion element.

FIG. 4 shows configuration examples of the wavelength conversion element 20 using the holding substrate 21 as the crystal holding unit. In the configuration example (a) in FIG. 4, the crystal aggregate 22 held on the substrate 21 is irradiated with the incident light L0 (signal light L1 and reference light L2) from above and the converted light L5 obtained is likewise output upward as in the configuration shown in FIG. 2. In the configuration example (b) in FIG. 4, the crystal aggregate 22 held on the substrate 21 is irradiated with the incident light L0 from above and the converted light L5 obtained is output downward. In this case, a substrate made of a material that transmits the visible converted light L5 must be used as the substrate 21.

In the configuration example (c) in FIG. 4, the crystal aggregate 22 held on the substrate 21 is irradiated with the incident light L0 from below and the converted light L5 obtained is output upward. In this case, a substrate made of a material that transmits the near-infrared incident light L0 must be used as the substrate 21. In the configuration example (d) in FIG. 4, the crystal aggregate 22 held on the substrate 21 is irradiated with the incident light L0 from below and the converted light L5 obtained is likewise output downward. In this case, a substrate made of a material that transmits both the near-infrared incident light L0 and the visible converted light L5 must be used as the substrate 21.

Figure 5:
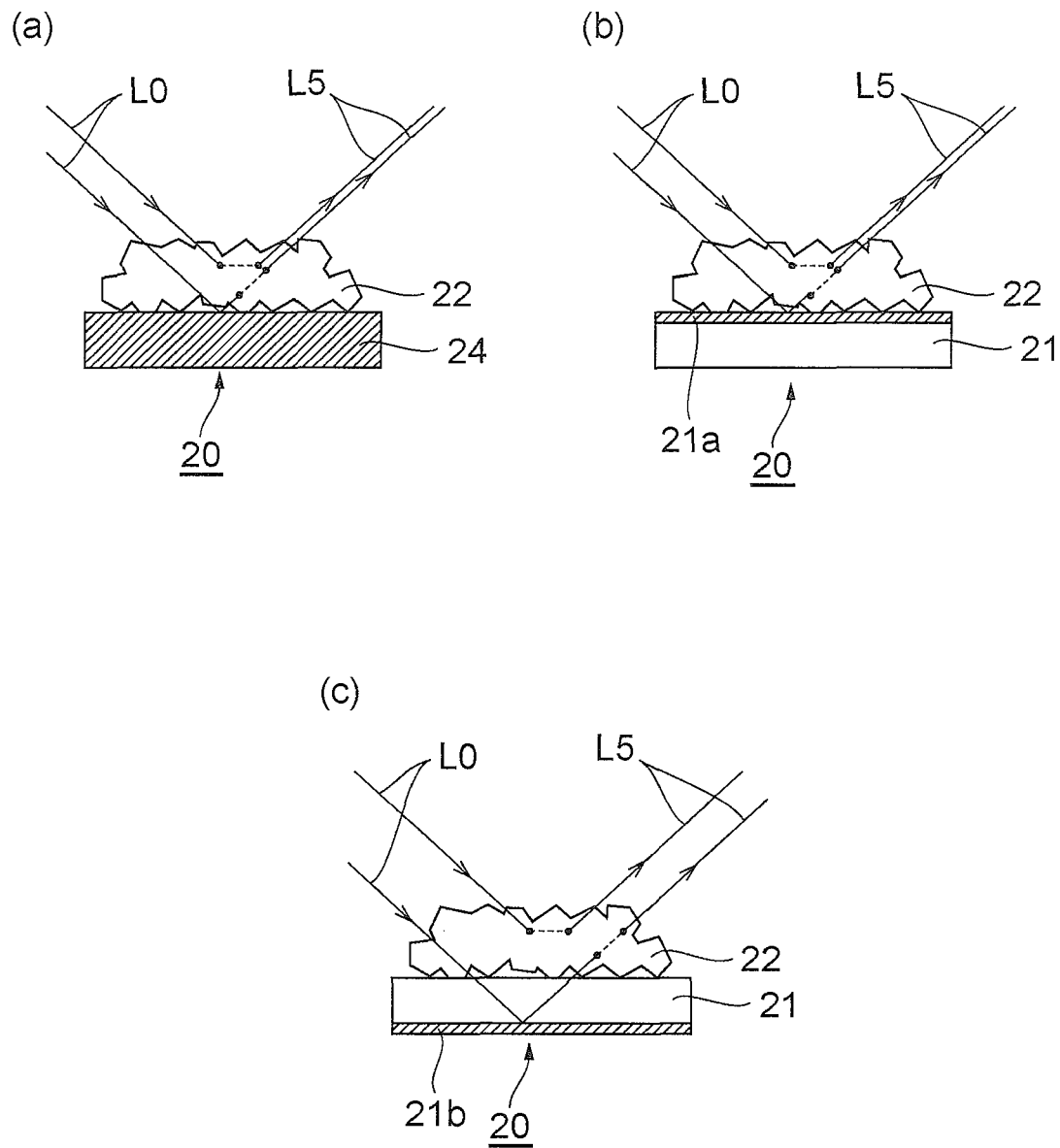
FIG. 5 shows diagrams of configuration examples of the wavelength conversion element.

FIG. 5 shows configuration examples of the wavelength conversion element 20 in which a holding substrate is used as the crystal holding unit and the holding substrate includes a reflecting unit that reflects the incident light L0. By thus making the holding substrate have the function of the reflecting unit for the incident light L0, the incident light L0 that has passed through the crystal aggregate 22 without undergoing wavelength conversion can be reflected by the holding substrate and made incident on the crystal aggregate 22 again. Utilization efficiency of the incident light L0 in the wavelength conversion element 20 can thereby be improved.

In the configuration example (a) in FIG. 5, a holding substrate 24 comprising a reflecting member of substrate form that reflects the incident light L0 is used as the holding substrate. In this case, the incident light L0 with which the crystal aggregate 22 is irradiated from above is reflected at an upper surface of the substrate 24. The configuration example (b) in FIG. 5 uses, as the holding substrate, the holding substrate 21 having a reflective film 21a formed on an upper surface side on which the crystal aggregate 22 is held. In this case, the incident light L0 is reflected at the reflective film 21a on the upper surface side of the substrate 21.

The configuration example (c) in FIG. 5 uses, as the holding substrate, the holding substrate 21 having a reflective film 21b formed on a lower surface side opposite the side on which the crystal aggregate 22 is held. In this case, the incident light L0 is transmitted through the holding substrate 21 and thereafter reflected at the reflective film 21b on the lower surface side of the substrate 21. With this configuration, a substrate made of a material that transmits the incident light L0 must be used as the substrate 21.

Figure 6:
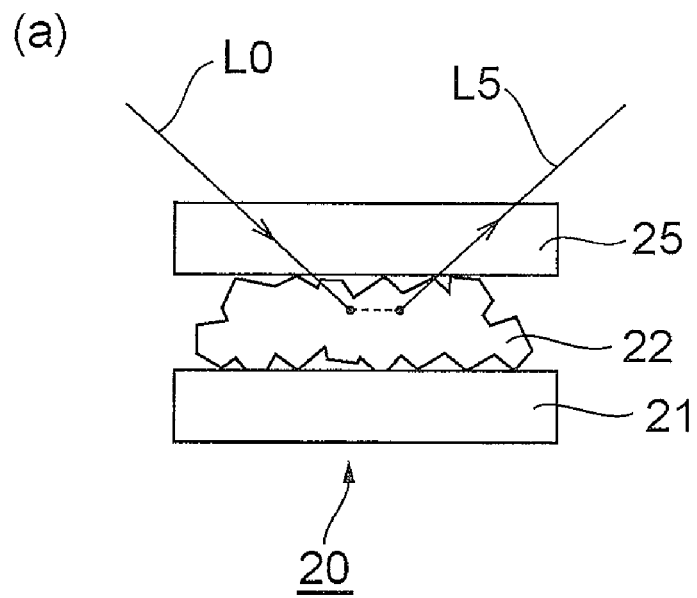
FIG. 6 shows diagrams of configuration examples of the wavelength conversion element.
Figure 6:
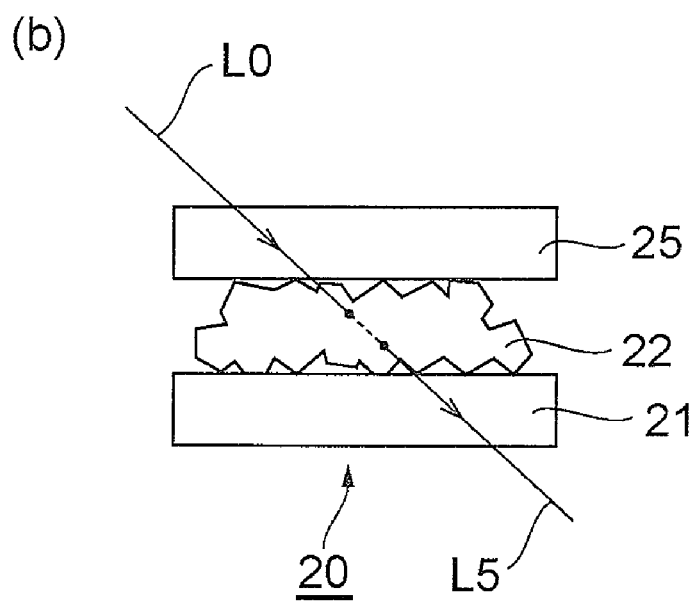
Figure 7:
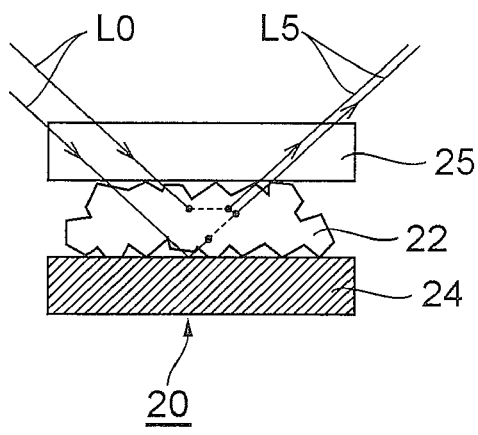
FIG. 7 shows diagrams of configuration examples of the wavelength conversion element.
Figure 7:
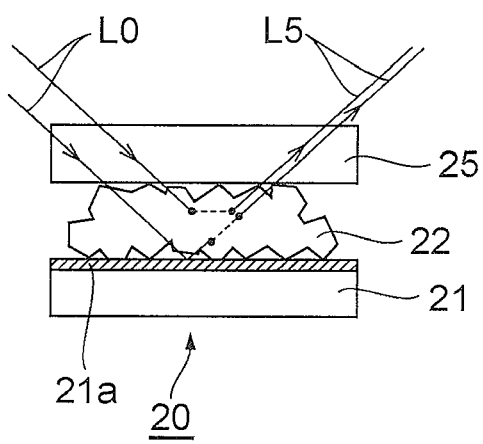
Figure 7:
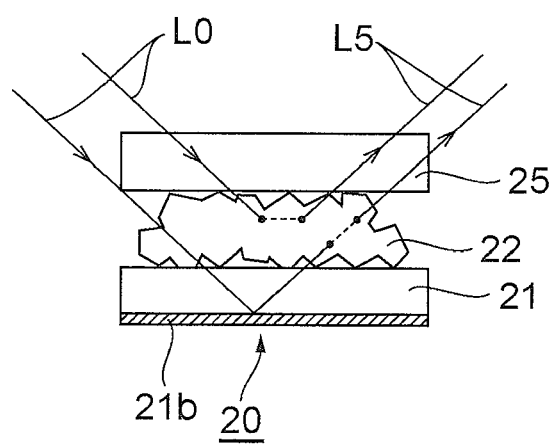

FIGS. 6 and 7 show configuration examples of the wavelength conversion element 20 in which two holding substrates that sandwichingly hold the crystal aggregate 22 are used as the crystal holding unit. Such a configuration is effective in terms of physically protecting the crystal aggregate 22. In the configuration example (a) in FIG. 6, the crystal aggregate 22 is held on the holding substrate 21 and a holding substrate 25, which, together with the substrate 21, sandwiches and holds the crystal aggregate 22, is disposed further above. In the present configuration example, the crystal aggregate 22 is irradiated with the incident light L0 from above and the converted light L5 obtained is likewise output upward. In this case, a substrate made of a material that transmits both the incident light L0 and the converted light L5 must be used as the substrate 25.

In the configuration example (b) in FIG. 6, although the configuration of the holding substrates 21 and 25 is the same as that of the configuration example (a), the crystal aggregate 22 is irradiated with the incident light L0 from above and the converted light L5 obtained is output downward. In this case, a substrate made of a material that transmits the incident light L0 must be used as the upper substrate 25 and a substrate made of a material that transmits the converted light L5 must be used as the lower substrate 21.

In the configuration examples (a) to (c) in FIG. 7, the configuration of using two holding substrates is applied to the configuration examples (a) to (c) in FIG. 5. In the configuration example (a) in FIG. 7, the crystal aggregate 22 is held on the substrate 24 made of the reflecting member, and the substrate 25 is disposed further above. In the configuration example (b) in FIG. 7, the crystal aggregate 22 is held on the substrate 21 having the reflective film 21a formed on the upper surface side, and the substrate 25 is disposed further above. In the configuration example (c) in FIG. 7, the crystal aggregate 22 is held on the substrate 21 having the reflective film 21b formed on the lower surface side, and the substrate 25 is disposed further above. In these configurations, a substrate made of a material that transmits both the incident light L0 and the converted light L5 must be used as the substrate 25.

The configurations of the signal waveform measuring apparatuses 1A and 1B shown in FIGS. 1 and 3 shall now be described further along with specific configuration examples, which are shown in FIGS. 8 to 14. Although in FIGS. 8 to 10, the signal light L1 and the reference light L2 are illustrated as being shifted in optical path for the sake of description, in actual configurations, these optical paths do not need to be shifted. Also, in the following, the direction in which light is guided shall be referred to as a z-axis, an axis orthogonal to the z-axis shall be referred to as an x-axis, and an axis orthogonal to the z-axis and the x-axis shall be referred to as a y-axis where necessary.

Figure 8:
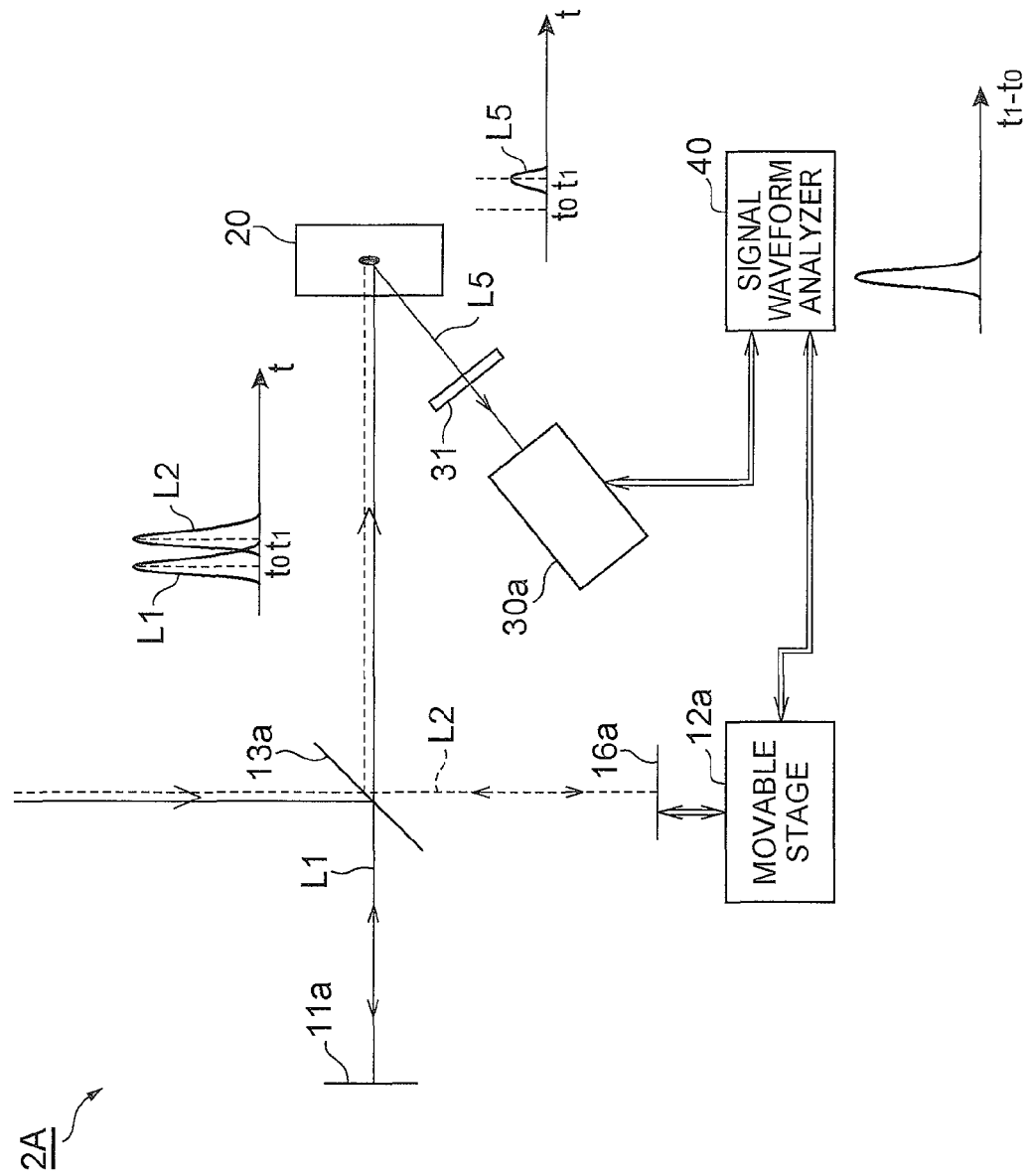
FIG. 8 is a diagram of a first configuration example of the signal waveform measuring apparatus.

FIG. 8 is a diagram of a first configuration example of the signal waveform measuring apparatus. In the measuring apparatus 2A of the present configuration example, a configuration where a portion of the signal light is branched and used as the reference light is used. Specifically, the signal waveform measuring apparatus 2A is configured from a half-mirror 13a functioning as the light branching unit, a reflecting mirror 11a of the signal optical system, a reflecting mirror 16a of the reference optical system, the wavelength conversion element 20 including the dye molecule crystal aggregate, a zero-dimensional photodetector 30a functioning as the photodetecting unit, and the signal waveform analyzer 40.

In the present configuration example, a reflection type configuration is used in which the photodetector 30a is disposed at the same side as the incidence side of the signal light L1 and the reference light L2 with respect to the wavelength conversion element 20. Further, a wavelength selection element 31 for taking out only a wavelength component of the dye emission at the element 20 as the converted light L5 is disposed between the wavelength conversion element 20 and the photodetector 30a. As specific examples of such a wavelength selection element 31, a band-pass filter, a spectrometer, etc., may be used.

Also, in the reference optical system, a movable stage 12a is provided for the reflecting mirror 16a to variably control the delay time of the reference light L2 by changing the position of the reflecting mirror 16a in the light guiding direction of the reference light L2. In the present configuration example, a time difference setting unit that sets the time difference between the signal light L1 and the reference light L2 is configured by a delay time control unit using the reflecting mirror 16a and the movable stage 12a. Also, in addition to the information on the detection result of the converted light L5 at the photodetector 30a, information on the time difference between the signal light L1 and the reference light L2 that is set by the movable stage 12a is input into the signal waveform analyzer 40.

In such a configuration, the signal light L1 that is reflected by the half-mirror 13a is reflected by the reflecting mirror 11a and thereafter transmitted through the half-mirror 13a and made incident on the wavelength conversion element 20. The reference light L2, which is transmitted through the half-mirror 13a and thereby branched from the signal light, is reflected by the reflecting mirror 16a installed on the movable stage 12a to be provided with the delay time $t_1$-$t_0$ and is thereafter reflected by the half-mirror 13a and made incident on the wavelength conversion element 20. By detecting the emission intensity of the converted light L5 at the element 20 by the photodetector 30a while changing the delay time by the movable stage 12a and performing analysis by the analyzer 40 in reference to the detection result and the time difference information, the time waveform of the signal light L1 is acquired.

In the measuring apparatus 2A shown in FIG. 8, the delay time control unit, configured by the movable stage 12a that is disposed in the reference optical system and variably controls the delay time of the reference light L2, is used as the time difference setting unit. With such a configuration, the time waveform of the signal light L1 can be acquired favorably by making measurements while changing the delay time by the movable stage 12a.

The specific configuration of the delay time control unit is not restricted to the configuration using the movable stage 12a as described above and various configurations may be used. Also, the delay time control unit may be disposed in the signal optical system. In general, the time difference setting unit that sets the time difference between the signal light L1 and the reference light L2 preferably has a configuration having a delay time control unit that is disposed in the signal optical system or the reference optical system and variably controls the delay time of the signal light or the reference light.

In such a configuration using the delay time control unit, the zero-dimensional photodetector 30a that detects the intensity of the converted light L5 is preferably used as the photodetector that detects the converted light L5. In regard to the photodetector 30a, it is preferable to use a photodetector having an adequate sensitivity in the wavelength band of the dye emission in the wavelength conversion element 20. Also, as the photodetector, a one-dimensional or a two-dimensional imaging element that detects an optical image (intensity distribution) of the converted light L5 may be used.

Figure 9:
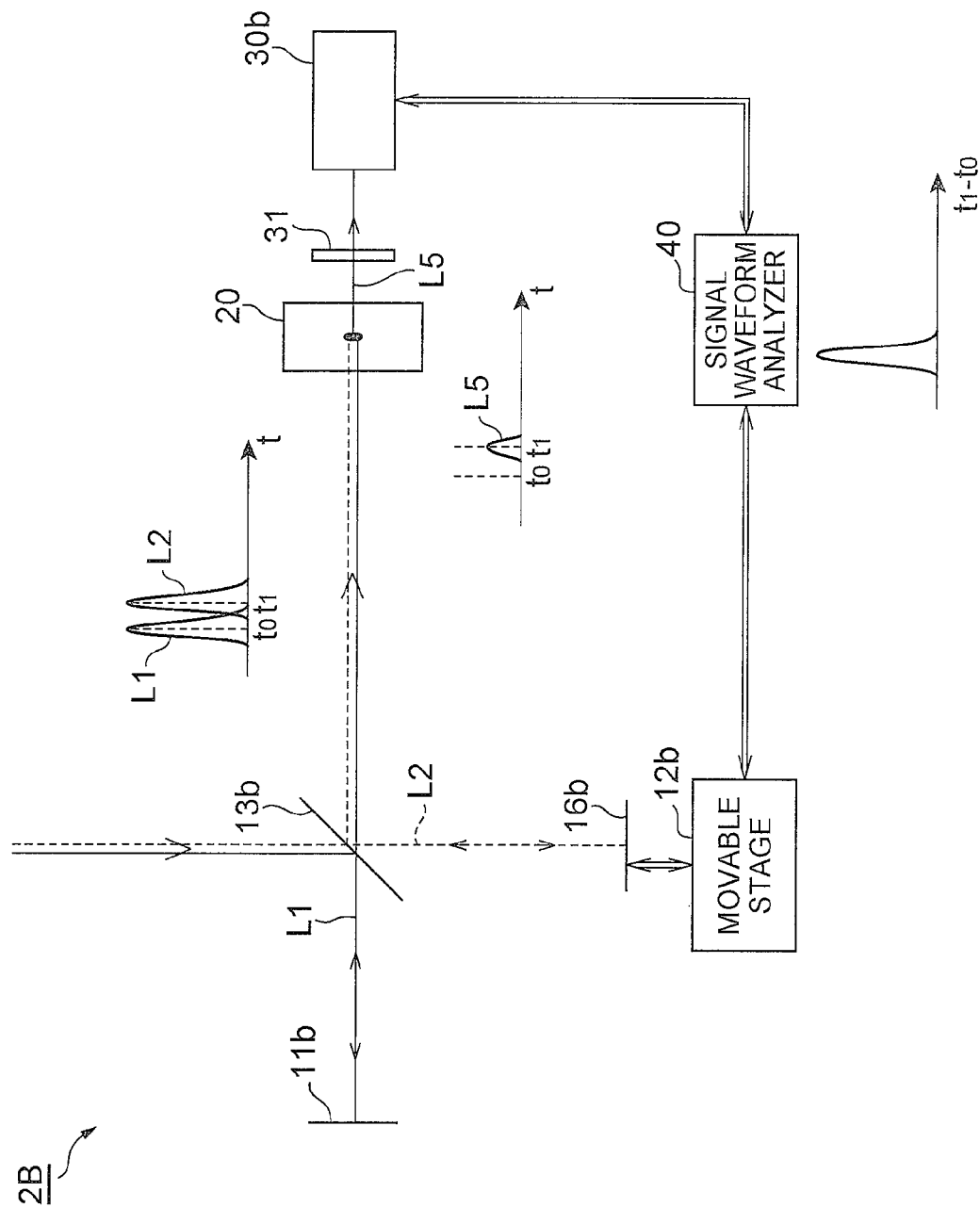
FIG. 9 is a diagram of a second configuration example of the signal waveform measuring apparatus.

FIG. 9 is a diagram of a second configuration example of the signal waveform measuring apparatus. In the measuring apparatus 2B of the present configuration example, the configuration of a half-mirror 13b, a reflecting mirror 11b, a reflecting mirror 16b, a movable stage 12b, the wavelength conversion element 20, and the signal waveform analyzer 40 is the same as the configuration in the measuring apparatus 2A shown in FIG. 8.

In the present configuration example, a transmission type configuration is used in which a photodetector 30b is disposed at the opposite side of the incidence side of the signal light L1 and the reference light L2 with respect to the wavelength conversion element 20. Further, the wavelength selection element 31 for taking out only the wavelength component of the dye emission at the element 20 as the converted light L5 is disposed between the wavelength conversion element 20 and the photodetector 30b. Thus, in regard to the positioning of the photodetector with respect to the wavelength conversion element 20, various configurations can be used in accordance with the specific configuration, measurement conditions, etc., of the apparatus.

Figure 10:
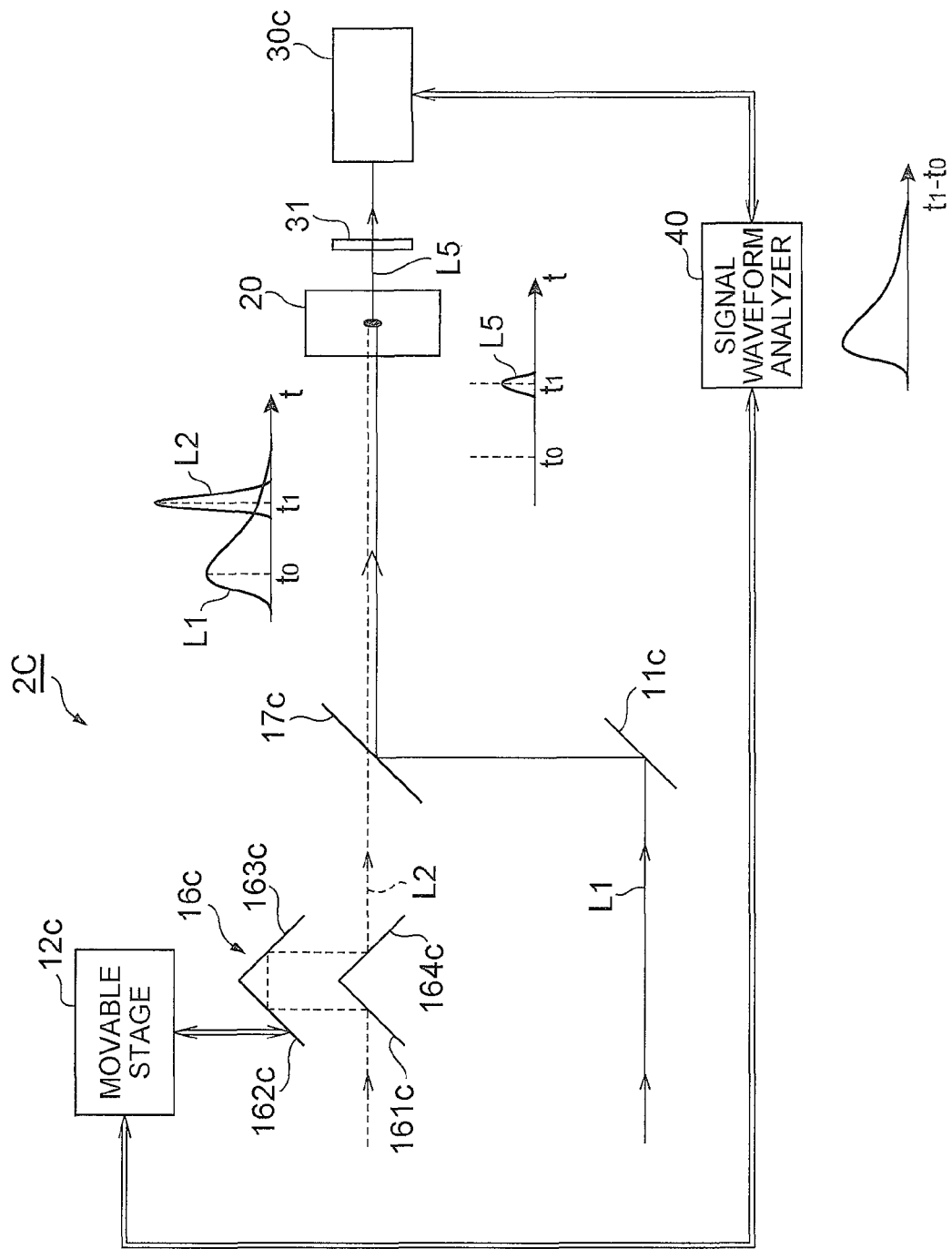
FIG. 10 is a diagram of a third configuration example of the signal waveform measuring apparatus.

FIG. 10 is a diagram of a third configuration example of the signal waveform measuring apparatus. In the measuring apparatus 2C of the present configuration example, a configuration that supplies the reference light separately from the signal light is used. Specifically, the signal waveform measuring apparatus 2C is configured from a reflecting mirror 11c of the signal optical system, a delay optical system 16c of the reference optical system, a half-mirror 17c functioning as the light coupling unit, the wavelength conversion element 20, a photodetector 30c, the wavelength selection element 31, and the signal waveform analyzer 40.

In the present configuration example, the delay optical system 16c, configured from four reflecting mirrors 161c to 164c, is disposed in the reference optical system. The movable stage 12c is provided for the reflecting mirrors 162c and 163c, among the reflecting mirrors 161c to 164c, to variably control the delay time of the reference light L2 by changing the positions of the reflecting mirrors 162c and 163c in the light guiding direction of the reference light L2. In the present configuration example, the time difference setting unit that sets the time difference between the signal light L1 and the reference light L2 is configured by the delay time control unit using the delay optical system 16c and the movable stage 12c.

In such a configuration, the signal light L1 is reflected by the reflecting mirror 11c and thereafter reflected by the half-mirror 17c and made incident on the wavelength conversion element 20. The reference light L2 passes through the delay optical system 16c, which includes the reflecting mirrors 162c and 163c that are installed on the movable stage 12c, to be provided with the delay time $t_1$-$t_0$ and is thereafter transmitted through the half-mirror 17c and made incident on the wavelength conversion element 20. By detecting the emission intensity of the converted light L5 by the photodetector 30c while changing the delay time by the movable stage 12c and performing analysis by the analyzer 40 in reference to the detection result and the time difference information, the time waveform of the signal light L1 is acquired.

As shown in FIGS. 8 to 10, in regard to the reference light L2, a configuration in which a portion of the signal light is branched and used as the reference light or a configuration in which the reference light is supplied separately from the signal light may be used in accordance with the specific configuration, measurement conditions, etc., of the apparatus. Also, in regard to the positioning of the photodetector with respect to the wavelength conversion element 20, although a transmission type configuration is shown as an example in FIG. 10, a reflection type configuration may be used instead.

Figure 11:
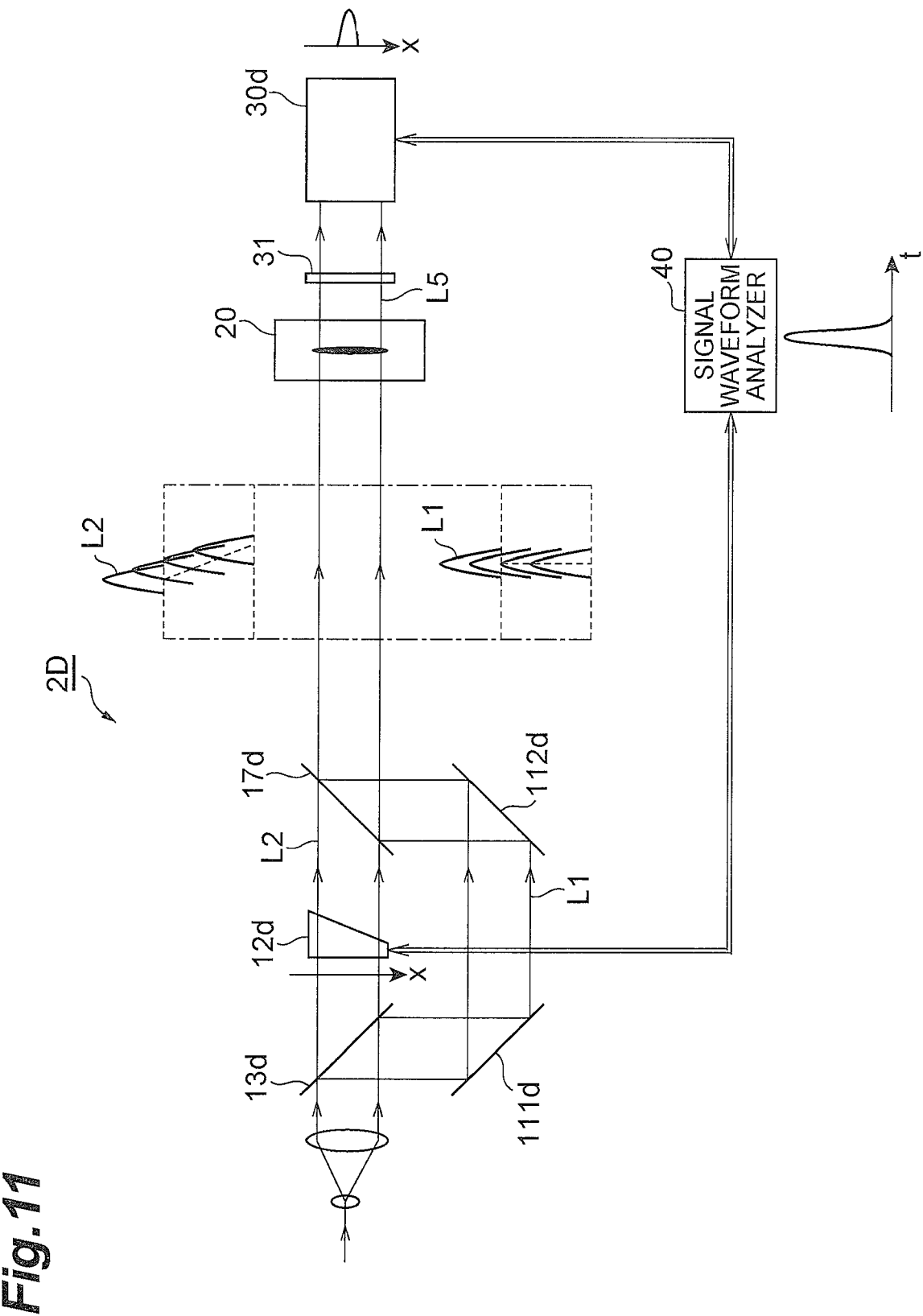
FIG. 11 is a diagram of a fourth configuration example of the signal waveform measuring apparatus.

FIG. 11 is a diagram of a fourth configuration example of the signal waveform measuring apparatus. In the measuring apparatus 2D of the present configuration example, a configuration in which a portion of the signal light is branched and used as the reference light is used. Specifically, the signal waveform measuring apparatus 2D is configured from a half-mirror 13d functioning as the light branching unit, reflecting mirrors 111d and 112d of the signal optical system, a delay element 12d of the reference optical system, a half-mirror 17d functioning as the light coupling unit, the wavelength conversion element 20, a photodetector 30d, the wavelength selection element 31, and the signal waveform analyzer 40. In FIGS. 11 to 14 that follow, spatial distributions of the time waveforms of the signal light L1 and the reference light L2 in the optical paths between the half-mirror and the wavelength conversion element are respectively illustrated schematically for the sake of description.

In the present configuration example, the delay element 12d is installed on the optical path of the reference light L2 in the reference optical system. The delay element 12d is configured of a transparent substrate that is made of a transparent medium, such as glass, etc., and varies in thickness along an axis (the x-axis in the figure) orthogonal to the light guiding direction of the reference light L2. In such a configuration, the delay time applied to the reference light L2 (the thickness of the glass etc., in the delay element 12d) differs according to position in the x-axis direction as indicated in the figure by the spatial distribution (corresponding to the time distribution) of the time waveforms of the reference light L2 after passage through the delay element 12d.

The delay element 12d is thus configured as a waveform setting unit having the x-axis, orthogonal to the light guiding direction of the reference light L2, as a time distribution measurement axis and setting the spatial waveform and the time waveform of the reference light L2 in a manner such that the delay time varies along the x-axis. In the present configuration example, the time difference setting unit that sets the time difference between the signal light L1 and the reference light L2 is configured by the waveform setting unit using the delay element 12d. Also, in addition to the information on the detection result of the converted light L5 at the photodetector 30d, information on the time difference set by the delay element 12d is input in advance into the signal waveform analyzer 40.

Further, in the present configuration example, in response to the configuration of the optical system, a one-dimensional or two-dimensional imaging element that detects the optical image (intensity distribution) of the converted light L5 is used as the photodetector 30d. Specifically, a one-dimensional imaging element (for example, a photodiode array), in which a plurality of pixels are arrayed in one dimension along the x-axis direction, may be used as the photodetector 30d. Or, a two-dimensional imaging element (for example, a CCD camera), in which a plurality of pixels are arrayed in two dimensions along the x-axis direction and the y-axis direction, may be used as the photodetector 30d.

In such a configuration, the signal light L1, which is reflected by the half-mirror 13d in a state of being enlarged in spot diameter by a lens, etc., is reflected by the reflecting mirrors 111d and 112d and thereafter reflected by the half-mirror 17d and made incident on the wavelength conversion element 20. The reference light L2, which is transmitted through the half-mirror 13d and thereby branched from the signal light, passes through the delay element 12d to be provided with the delay time distribution in the x-axis direction and is thereafter transmitted through the half-mirror 17d and made incident on the wavelength conversion element 20. The intensity distribution in the x-axis direction of the emission intensity of the converted light L5 at the element 20 is then detected by the photodetector 30d, and by performing analysis by the analyzer 40 in reference to the detection result and the time difference information, the time waveform of the signal light L1 is acquired.

In the measuring apparatus 2D shown in FIG. 11, the waveform setting unit by the delay element 12d, which is disposed in the reference optical system with the axis orthogonal to the light guiding direction of the reference light L2 as a time distribution measurement axis and sets the spatial waveform and the time waveform of the reference light L2 in a manner such that the delay time varies along the time distribution measurement axis, is used as a time difference setting unit. With such a configuration, the time waveform of the signal light L1 can be acquired favorably by detecting the optical image of the converted light L5 in response to the delay time distribution applied by the delay element 12d. The wavelength conversion element 20, based on the dye molecule crystal aggregate, can be made large in area readily and is thus effective in the configuration in which the optical image of the converted light L5 is detected.

The specific configuration of the waveform setting unit is not restricted to the above-described configuration using the delay element 12d and various configurations may be used. In such a configuration using the waveform setting unit, it is preferable to use the one-dimensional or two-dimensional imaging element 30d that detects the optical image of the converted light L5 in the x-axis (time distribution measurement axis) direction as the photodetector that detects the converted light L5.

In regard to the imaging element 30d, it is preferable to use an element having an adequate sensitivity in the wavelength band of the dye emission in the wavelength conversion element 20. As examples of such an imaging element, for example, a CCD camera can be cited in a case where the wavelength band of the dye emission is 400 nm to 1000 nm, and an InGaAs camera can be cited in a case where the wavelength band is 940 nm to 1700 nm. Also, in regard to the positioning of the photodetector with respect to the wavelength conversion element 20, although a transmission type configuration is shown as an example in FIG. 11, a reflection type configuration may be used instead.

Figure 12:
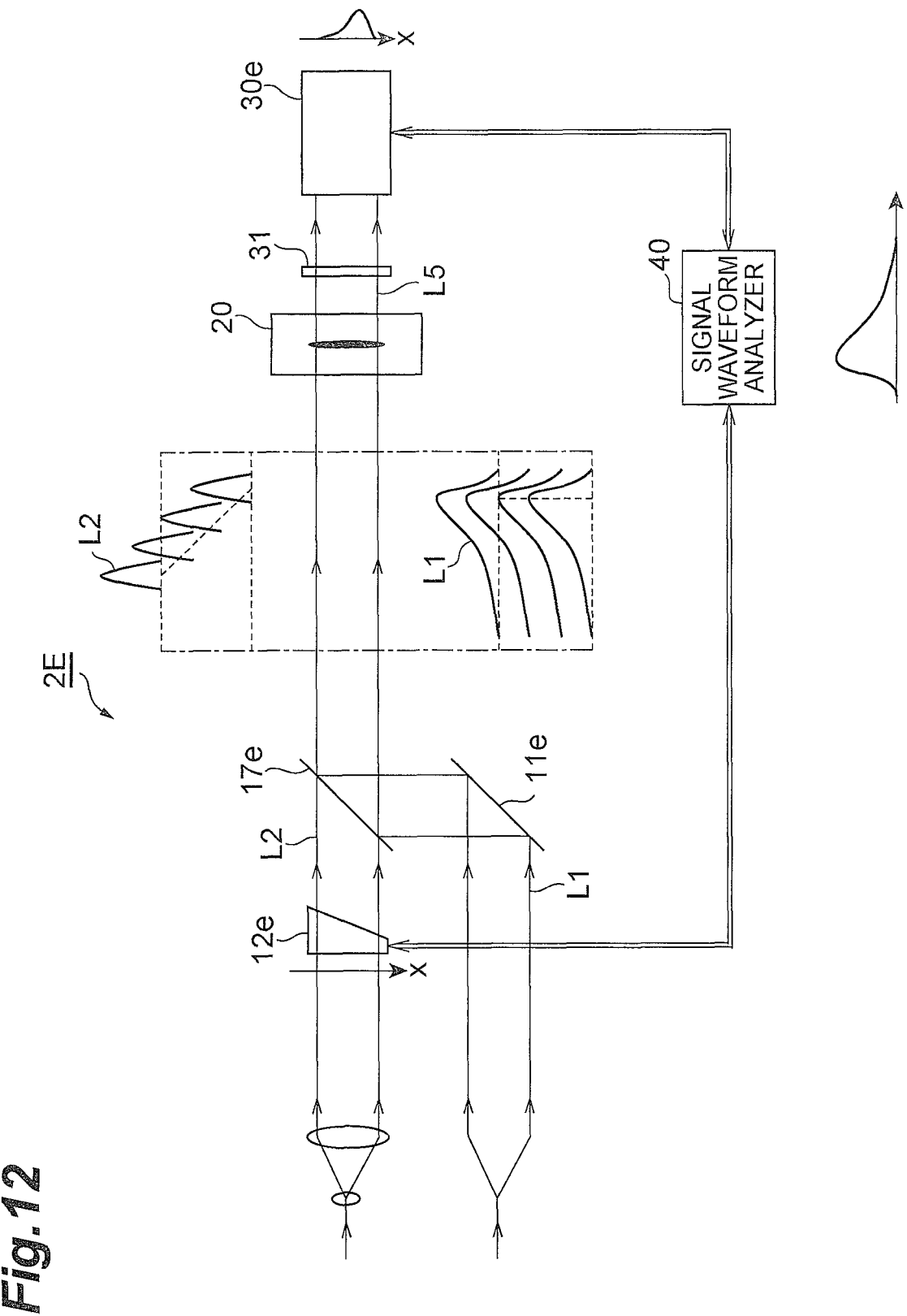
FIG. 12 is a diagram of a fifth configuration example of the signal waveform measuring apparatus.

FIG. 12 is a diagram of a fifth configuration example of the signal waveform measuring apparatus. In the measuring apparatus 2E of the present configuration example, a configuration that supplies the reference light separately from the signal light is used. Specifically, the signal waveform measuring apparatus 2E is configured from a reflecting mirror 11e of the signal optical system, a delay element 12e of the reference optical system, a half-mirror 17e functioning as the light coupling unit, the wavelength conversion element 20, a photodetector 30e, the wavelength selection element 31, and the signal waveform analyzer 40.

In the present configuration example, the delay element 12e, which sets the spatial waveform and the time waveform of the reference light L2 in a manner such that the delay time varies along the x-axis, is installed on the optical path of the reference light L2 in the reference optical system, and the time difference setting unit that sets the time difference between the signal light L1 and the reference light L2 is configured by the waveform setting unit using the delay element 12e. Also, in addition to the information on the detection result of the converted light L5 at the photodetector 30e, information on the time difference set by the delay element 12e is input into the signal waveform analyzer 40. Further, in the present configuration example, a one-dimensional or two-dimensional imaging element that detects the optical image of the converted light L5 is used as the photodetector 30e.

As shown in FIGS. 11 and 12, in regard to the reference light L2, a configuration in which a portion of the signal light is branched and used as the reference light or a configuration in which the reference light is supplied separately from the signal light may be used in accordance with the specific configuration, measurement conditions, etc., of the apparatus. Also, in regard to the positioning of the photodetector with respect to the wavelength conversion element 20, although a transmission type configuration is shown as an example in FIG. 12, a reflection type configuration may be used instead.

Figure 13:
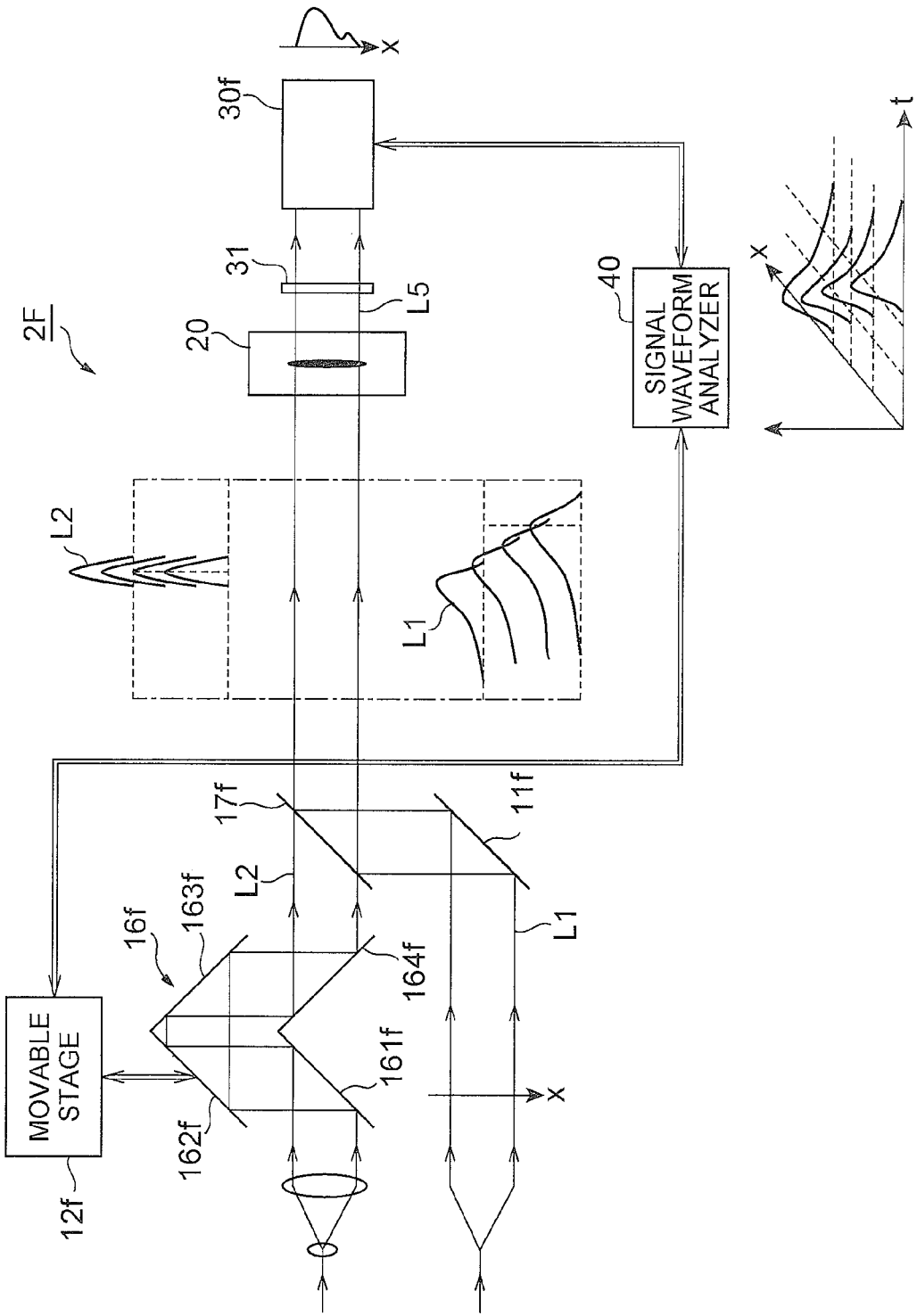
FIG. 13 is a diagram of a sixth configuration example of the signal waveform measuring apparatus.

FIG. 13 is a diagram of a sixth configuration example of the signal waveform measuring apparatus. In the measuring apparatus 2F of the present configuration example, the configuration of a reflecting mirror 11f, a delay optical system 16f, including reflecting mirrors 161f to 164f, a movable stage 12f, a half-mirror 17f, the wavelength conversion element 20, the wavelength selection element 31, and the signal waveform analyzer 40 is basically the same as the configuration in the measuring apparatus 2C shown in FIG. 10.

In the present configuration example, a case is presumed where the time waveform of the signal light L1, which is to be subject to the measurement of the time waveform, differs spatially in the x-axis direction orthogonal to the light guiding direction of the signal light L1 as shown by the spatial distribution of the time waveform of the signal light L1 in the figure. In response to such a signal light L1, a one-dimensional or two-dimensional imaging element that detects the optical image of the converted light L5 in the x-axis direction is used as the photodetector 30f.

As shown in FIG. 13, in regard to the time waveform of the signal light L1, the spatial distribution of the time waveform can be measured by using an imaging element as the photodetector 30f. Although in the above example, the signal light L1, with which the time waveform differs spatially in the x-axis direction, is presumed, for example, in a case where the signal light L1, with which the time waveform differs spatially in the x-axis direction and the y-axis direction is subject to the measurement, a two-dimensional spatial distribution of the time waveform can be measured by using a two-dimensional imaging element as the photodetector. Also, in regard to the positioning of the photodetector with respect to the wavelength conversion element 20, although a transmission type configuration is shown as an example in FIG. 13, a reflection type configuration may be used instead.

Figure 14:
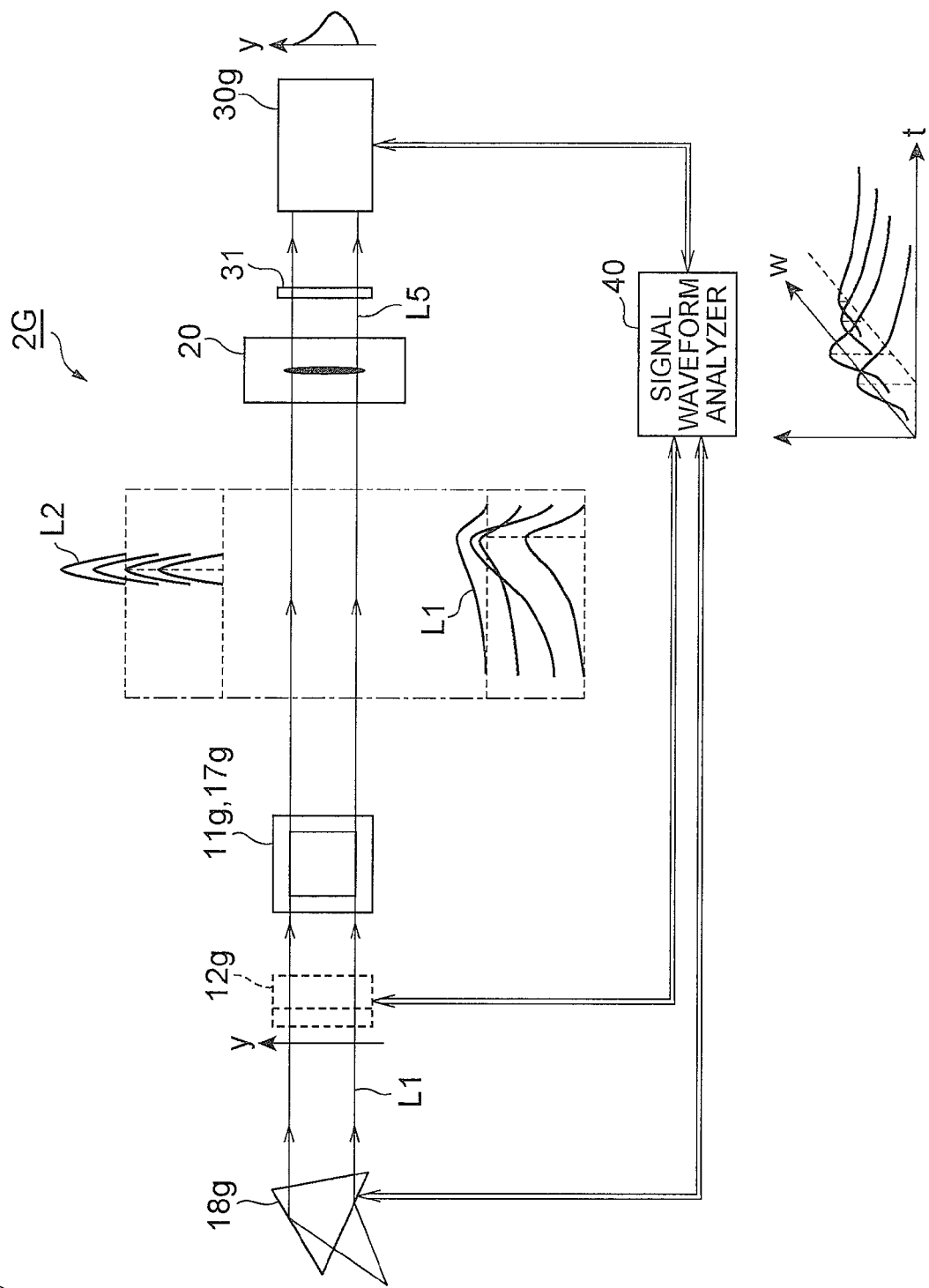
FIG. 14 is a diagram of a seventh configuration example of the signal waveform measuring apparatus.

FIG. 14 is a diagram of a seventh configuration example of the signal waveform measuring apparatus. In the measuring apparatus 2G of the present configuration example, the configuration of a reflecting mirror 11g, a delay element 12g, a half-mirror 17g, the wavelength conversion element 20, the wavelength selection element 31, and the signal waveform analyzer 40 is basically the same as the configuration in the measuring apparatus 2E shown in FIG. 12. Also, in regard to the overall configuration of the measuring apparatus 2G the configuration as viewed in the xz plane is the same as that in FIG. 12. Thus, in FIG. 14, the configuration of the measuring apparatus 2G as viewed in the yz plane that is orthogonal to the x-axis is shown.

In the present configuration example, a spectroscopic prism 18g is installed in the signal optical system for the signal light L1 that is to be subject to the measurement of the time waveform. The spectroscopic prism 18g is a spectroscopic unit that has an axis (the y-axis in the figure) orthogonal to the light guiding direction of the signal light L1 as a wavelength distribution measurement axis (spectroscopic axis) and spectrally resolves the signal light L1 in a manner such that the wavelength varies along the y-axis direction. In response to such a spectrally resolved signal light L1, a two-dimensional imaging element that detects the optical image of the converted light L5 is used as the photodetector 30g. Also, in addition to the information on the detection result of the converted light L5 at the photodetector 30g, the information on the time difference set by the delay element 12g and wavelength information concerning the spectral resolution of the signal light L1 by the spectroscopic prism 18g are input into the signal waveform analyzer 40.

As shown in FIG. 14, in regard to the time waveform of the signal light L1, by disposing, in the signal optical system, a spectroscopic unit that spectrally resolves the signal light L1 in a manner such that the wavelength varies along the wavelength distribution measurement axis orthogonal to the light guiding direction of the signal light L1, the measurement of the time waveform can be performed simultaneously for respective wavelength components contained in the signal light. In the configuration of FIG. 14, the x-axis is the time distribution measurement axis and the y-axis is the wavelength distribution measurement axis as mentioned above. The specific configuration of the spectroscopic unit is not restricted to the configuration using the spectroscopic prism 18g described above, and, for example, various configurations, such as a grating, etc., may be used. Also, in regard to the positioning of the photodetector with respect to the wavelength conversion element 20, although a transmission type configuration is shown as an example in FIG. 14, a reflection type configuration may be used instead.

The measurement of the time waveform of the signal light L1 using the signal waveform measuring apparatus with the above-described configuration shall now be described further along with specific measurement examples.

Figure 15:
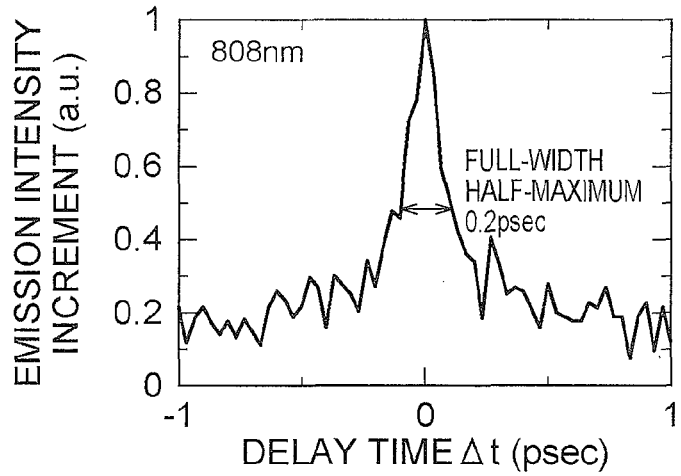
FIG. 15 shows graphs of an example of time waveform measurement results of signal light.
Figure 15:
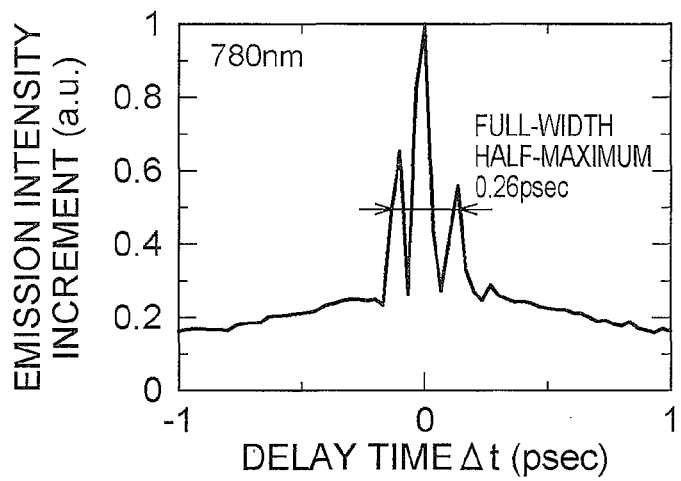
Figure 15:
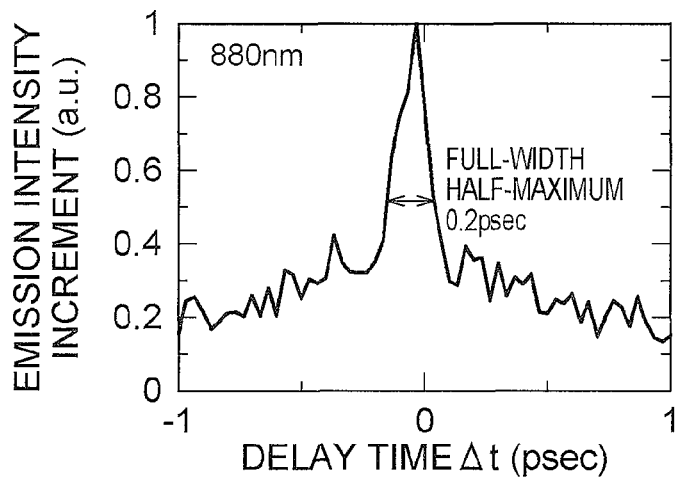

FIG. 15 shows graphs of an example of measurement results of time waveforms of the signal light. In the present measurement example, the measuring apparatus 2A of the first configuration example shown in FIG. 8 was used as the signal waveform measuring apparatus. A photomultiplier (H7421-40, manufactured by Hamamatsu Photonics K.K.), which is a zero-dimensional photodetector, was used as the photodetector 30a, only the wavelength component of the dye emission in the converted light L5 from the wavelength conversion element 20 was taken out by the wavelength selection element 31, and the emission intensity of the converted light L5 was measured by a photon counting method. In the configuration of FIG. 8, if d (μm) is a movement amount of the reflecting mirror 16a by the movable stage 12a, this can be converted as 2 d/300 (psec) to the delay time Δt that is applied to the reference light L2.

Also, with the present measurement example, the time waveform measurement results are shown for the case where Coumarin 480 was used as the dye molecule of the wavelength conversion element 20 and a central wavelength of pulsed light used as the signal light L1 and the reference light L2 was varied at 808 nm, 780 nm, and 880 nm.

The graph (a) in FIG. 15 shows the time waveform measurement result for the case where the wavelength of the pulsed light is 808 nm. In the graph, an abscissa indicates the delay time Δt (psec) of the reference light L2 that corresponds to the time difference between the signal light L1 and the reference light L2, and an ordinate indicates the emission intensity (a. u.) of the converted light L5 detected by the photodetector.

Here, in regard to the emission intensity of the ordinate, the emission intensity for the case where the signal light L1 and the reference light L2 are separated largely in time and are not overlapped is used as a baseline to normalize just the increment of the emission intensity due to overlapping of the signal light L1 and the reference light L2 in time. The change in such an emission intensity increment with respect to the delay time Δt corresponds to the time waveform of the signal light L1 as mentioned above. As shown in the graph (a), in the measurement result for the pulsed light of 808 nm wavelength, a full-width half-maximum (FWHM) of the time variation of the emission intensity that corresponds to the time waveform of the signal light L1 is 0.2 psec.

The graph (b) in FIG. 15 shows the time waveform measurement result for the case where the wavelength of the pulsed light is 780 nm. In the measurement result, the full-width half-maximum of the time variation of the emission intensity is 0.26 psec. The graph (c) in FIG. 15 shows the time waveform measurement result for the case where the wavelength of the pulsed light is 880 nm. In the measurement result, the full-width half-maximum of the time variation of the emission intensity is 0.2 psec.

Figure 16:
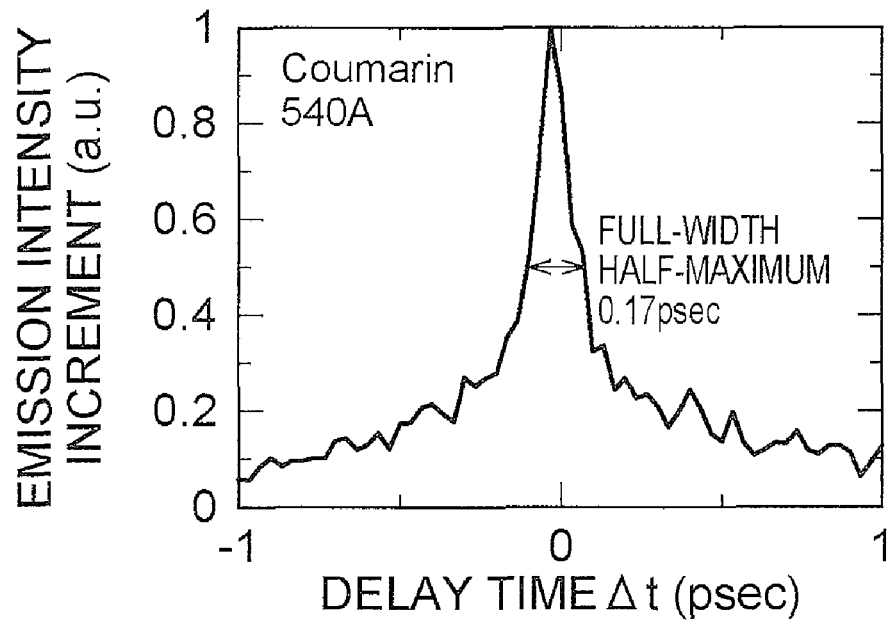
FIG. 16 shows graphs of an example of time waveform measurement results of signal light.
Figure 16:
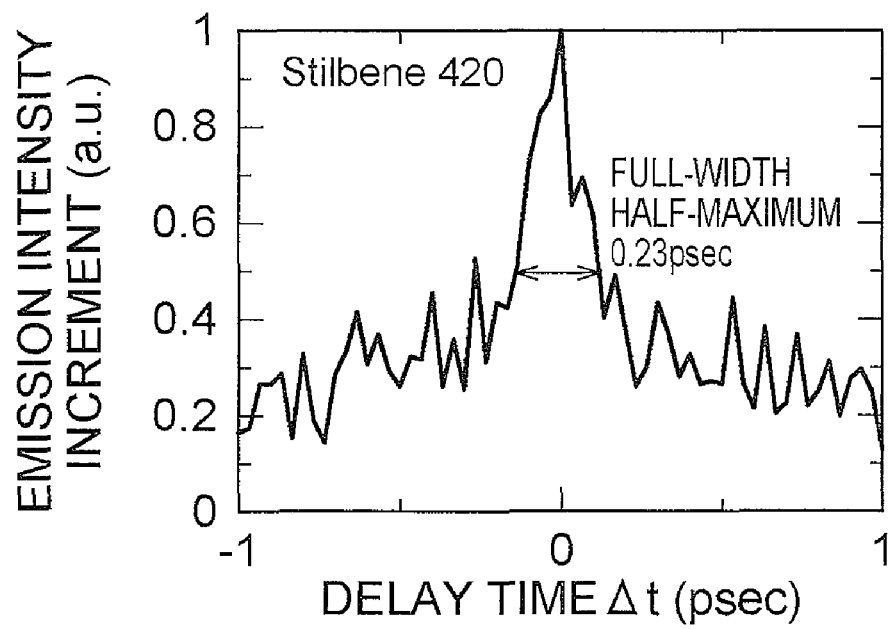

FIG. 16 shows graphs of another example of time waveform measurement results of the signal light. As the configuration of the measuring apparatus used in the present measurement example, the same configuration as that for the case of the measurement results shown in FIG. 15 was used. Also, in the present measurement example, the central wavelength of the pulsed light used as the signal light L1 and the reference light L2 was fixed at 808 nm, and the time waveform measurement results for cases of changing the dye molecule in the wavelength conversion element 20 to Coumarin 540A and Stilbene 420 are shown.

The graph (a) in FIG. 16 shows the time waveform measurement result for the case where Coumarin 540A is used as the dye molecule of the wavelength conversion element. In the measurement result, the full-width half-maximum of the time variation of the emission intensity that corresponds to the time waveform of the signal light L1 is 0.17 psec. The graph (b) in FIG. 16 shows the time waveform measurement result for the case where Stilbene 420 is used as the dye molecule. In the measurement result, the full-width half-maximum of the time variation of the emission intensity is 0.23 psec.

Figure 17:
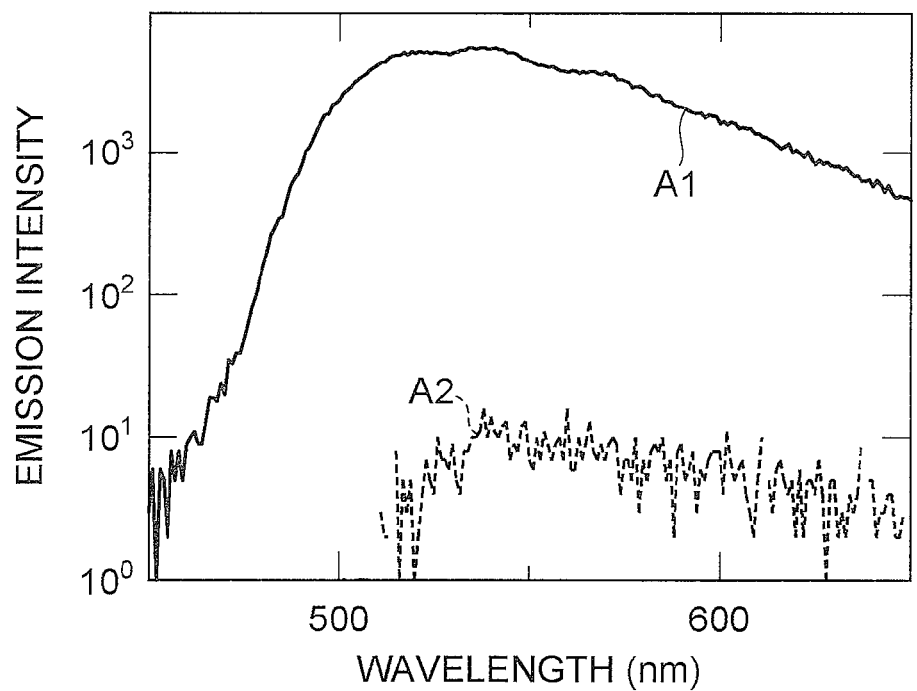
FIG. 17 shows graphs of an example of respective measurement results in a case of using the wavelength conversion element and a case of utilizing two-photon absorption and emission.
Figure 17:
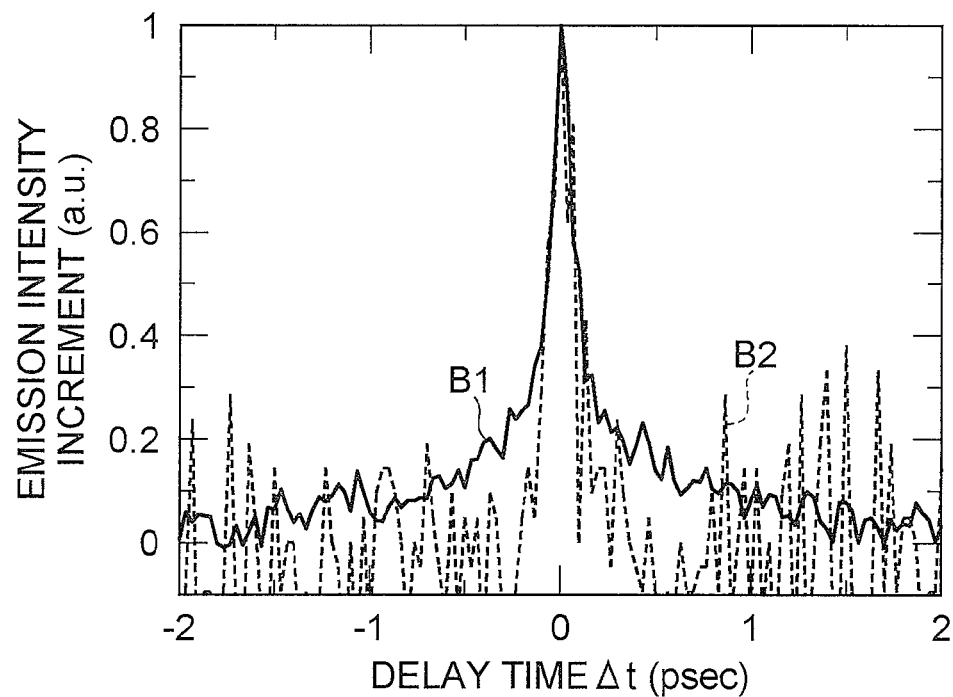

FIG. 17 shows graphs of an example of respective measurement results in a case of using the wavelength conversion element of the above-described configuration and a case of utilizing two-photon absorption and resulting emission. In the present measurement example, the measurement results obtained when Coumarin 540A was used as the dye molecule of the wavelength conversion element and the central wavelength of the pulsed light used as the signal light L1 and the reference light L2 was 808 nm are shown. With the comparative example using the two-photon absorption emission, the measurement results are shown for a case where a sample, in which Coumarin 540A was dissolved completely in acetone, was used in place of the wavelength conversion element of the above-described configuration.

The graph (a) in FIG. 17 shows a wavelength dependence of the emission intensity of the converted light obtained by the wavelength conversion element or the above-described sample. Specifically, graph A1 shows the measurement result of the emission intensity in the case of using the wavelength conversion element that includes the dye molecule crystal aggregate, and graph A2 shows the measurement result of the emission intensity due to two-photon absorption in the case of using the sample in which the dye molecule is dissolved in acetone.

As shown by these graphs, in comparison to graph A2 of the emission by the sample in which the dye molecule is dissolved, an emission intensity that is approximately 600 times higher is obtained in graph A1 of the emission by the wavelength conversion element. This is considered to be due to excitation in two stages occurring more readily in the generation of the converted light by excitation via vibrational levels that are actual levels as described above in comparison to two-photon absorption emission by excitation via virtual levels.

Also, the graph (b) in FIG. 17 shows the time waveform measurement result of pulsed light in the case of using the wavelength conversion element or the above-described sample. Specifically, graph B1 shows the time waveform measurement result in the case of using the wavelength conversion element that includes the dye molecule crystal aggregate, and graph B2 shows the time waveform measurement result in the case of using the sample in which the dye molecule is dissolved in acetone. As shown by these graphs, in comparison to the measurement result obtained with the sample in which the dye molecule was dissolved, an S/N ratio measured is better in the measurement result obtained with the wavelength conversion element. By such a method, the time waveform of even pulsed light of low peak intensity can be measured with good precision.

Figure 18:
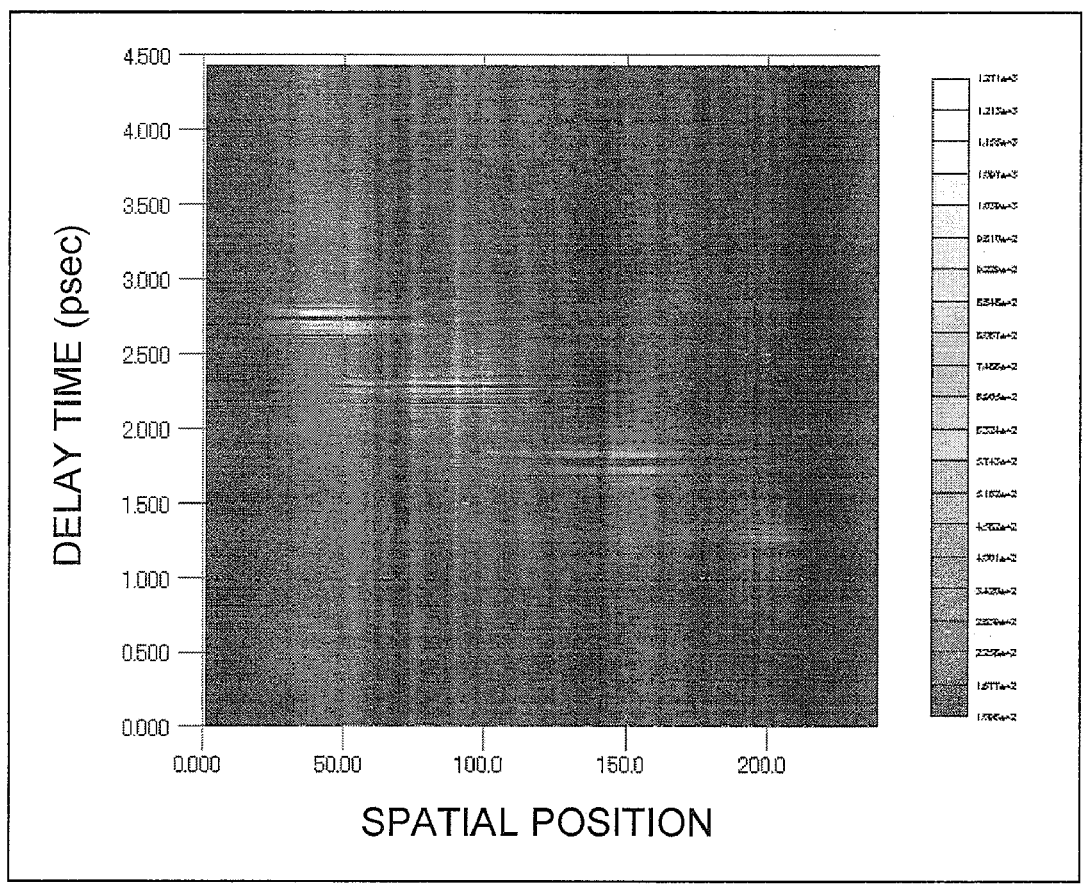
FIG. 18 is a graph of an example of a measurement result of a time waveform and a spatial waveform of signal light.

FIG. 18 is a graph of an example of a measurement result of the time waveform and the spatial waveform of signal light. In the present measurement example, the measuring apparatus 2F of the sixth configuration example shown in FIG. 13 was used as the signal waveform measuring apparatus. In regard to the signal light L1 and the reference light L2, each was shaped by a cylindrical lens to a line-like form spreading in the x-axis direction (see FIG. 13), and a line-like emission image from the wavelength conversion element 20 was measured. The signal light L1 was pulsed light that spatially differs in time waveform in the x-axis direction. The central wavelength of each of the signal light L1 and the reference light L2 is 805 nm.

Coumarin 540A, sealed in a quartz cell, was used as the dye molecule in the wavelength conversion element 20. In regard to the positioning of the photodetector 30$f$, the reflecting type configuration in which the photodetector 30$f$ is positioned at the same side as the incidence side of the signal light L1 and the reference light L2 was used. A CCD camera (WAT-231S2, manufactured by Watec Co., Ltd.), which is a two-dimensional imaging device, was used as the photodetector 30$f$ and only the wavelength component of the dye emission in the converted light L5 from the wavelength conversion element 20 was taken out by the wavelength selection element 31 to acquire and record the emission image while changing the delay time of the reference light L2.

In the configuration of FIG. 13, if d (μm) is a movement amount of the reflecting mirrors 162$f$ and 163$f$ by the movable stage 12$f$, this can be converted as 2 d/300 (psec) to the delay time Δt that is applied to the reference light L2. By bringing together the line-like emission images acquired for the respective delay times, information on the time waveform of the signal light L1 at the respective spatial positions can be obtained.

In the graph of FIG. 18, the abscissa indicates the spatial position in the x-axis direction and the ordinate indicates the delay time Δt (psec) applied to the reference light L2. It can be understood that in the present measurement example, the signal light L1 is spatially divided into four parts and has pulsed shape with a time delay of approximately 0.5 psec in each spatial region.

The signal waveform measuring apparatus and the signal waveform measuring method according to the present invention are not restricted to the embodiments and configuration examples described above and can be modified variously. For example, the configuration of the wavelength conversion element 20 and the dye molecule used in the element 20 are not restricted to the configurations described above, and specifically, various configurations may be used. Also, in regard to the configurations of the optical systems for guiding the signal light L1, the reference light L2, and the converted light L5 or the configuration of the time difference setting unit for setting the time difference between the signal light L1 and the reference light L2 and the like, the above configurations are examples thereof and specifically, various other configurations may be used instead.

Here, the signal waveform measuring apparatus according to the above-described embodiments includes: (1) a signal optical system guiding pulsed signal light that is to be subject to measurement of a time waveform; (2) a reference optical system guiding reference light used in measuring the time waveform of the signal light; (3) a time difference setting unit disposed at least in one of either the signal optical system or the reference optical system and setting a time difference between the signal light and the reference light; (4) a wavelength conversion element including an aggregate of crystals of a dye molecule and generating converted light, which has been wavelength-converted to a shorter wavelength than incident light made incident on the dye molecule crystal aggregate, at an intensity proportional to an r-th power (r>1) of the intensity of the incident light; (5) a photodetecting unit detecting the converted light, which is generated at the wavelength conversion element by the incidence of the signal light from the signal optical system and the reference light from the reference optical system and at the intensity that is in accordance with the intensity of the signal light, the intensity of the reference light, and the time difference between the two; and (6) a signal waveform analyzing unit performing analysis of the converted light detection result at the photodetecting unit and thereby acquiring the time waveform of the signal light.

The signal waveform measuring method according to the above-described embodiments includes: (1) a signal light guiding step of guiding, by a signal optical system, pulsed signal light that is to be subject to measurement of a time waveform; (2) a reference light guiding step of guiding, by a reference optical system, reference light used in measuring the time waveform of the signal light; (3) a time difference setting step of setting a time difference between the signal light and the reference light in at least one of either the signal optical system or the reference optical system; (4) a wavelength conversion step of using a wavelength conversion element, including an aggregate of crystals of a dye molecule, to generate converted light, which has been wavelength-converted to a shorter wavelength than incident light made incident on the dye molecule crystal aggregate, at an intensity proportional to an r-th power (r>1) of the intensity of the incident light; (5) a photodetecting step of detecting the converted light, which is generated at the wavelength conversion element, by the incidence of the signal light from the signal optical system and the reference light from the reference optical system and at the intensity that is in accordance with the intensity of the signal light, the intensity of the reference light, and the time difference between the two; and (6) a signal waveform analyzing step of performing analysis of the converted light detection result at the photodetecting step and thereby acquiring the time waveform of the signal light.

In the measuring apparatus and measuring method of the above configurations, each of the signal light and the reference light is preferably light of a wavelength longer than the absorption edge of the dye molecule in the wavelength conversion element. The generation of the converted light in the wavelength conversion element and accordingly the measurement of the time waveform of the signal light can thereby be executed favorably.

The wavelength conversion element is preferably configured in the condition of generating the converted light at the intensity proportional to the r-th power (r≧2) of the intensity of the incident light. Although in the measurement of the time waveform of the signal light using the wavelength conversion element, acquisition of the time waveform is possible as long as conditions are such that the converted light intensity is proportional to the r-th power (r>1) of the incident light intensity as described above, acquisition of the time waveform can be performed reliably in particular under conditions where the converted light intensity is proportional to the r-th power (r≧2) of the incident light intensity, for example, under conditions where the converted light intensity is proportional to the square of the incident light intensity. Such conditions can be set and adjusted according to the wavelength of the signal light, the wavelength of the reference light, and the selection of the dye molecule of the wavelength conversion element with respect to the signal light and the reference light.

In regard to the specific configuration of the signal waveform measuring apparatus, a configuration may be used where the time difference setting unit that sets the time difference between the signal light and the reference light has a delay time control unit disposed in the signal optical system or the reference optical system and variably controlling the delay time of the signal light or the reference light. Or, a configuration may be used where the time difference setting unit has a waveform setting unit disposed in the reference optical system with an axis orthogonal to the light guiding direction of the reference light as the time distribution measurement axis and setting the spatial waveform and the time waveform of the reference light in a manner such that the delay time varies along the time distribution measurement axis.

Also, the measuring apparatus may further include, in addition to the time difference setting unit, a spectroscopic unit disposed in the signal optical system with an axis orthogonal to the light guiding direction of the signal light as the wavelength distribution measurement axis and spectrally resolving the signal light in a manner such that the wavelength varies along the wavelength distribution measurement axis. In this case, the measurement of the time waveform can be performed simultaneously for respective wavelength components contained in the signal light.

In regard to the detection of the converted light from the wavelength conversion element, a configuration may be used where the photodetecting unit has a zero-dimensional photodetector that detects the intensity of the converted light. Such a configuration is especially favorable in a configuration of using the delay time control unit that variably controls the delay time of the signal light or the reference light. Or, a configuration may be used where the photodetecting unit has a one-dimensional or two-dimensional imaging element that detects the optical image of the converted light. Such a configuration is especially favorable in a configuration of using the waveform setting unit that sets the spatial waveform and the time waveform of the reference light in a manner such that the delay time varies along the time distribution measurement axis.

In regard to the supplying of the reference light used in measuring the time waveform of the signal light, the measuring apparatus may use a configuration that includes a reference light source that supplies the reference light. Or, a configuration that includes a light branching unit that branches a portion of the signal light to generate the reference light may be used.

In regard to the specific configuration of the wavelength conversion element, a configuration in which the dye molecule crystal aggregate is held by the crystal holding unit is preferable. Particularly, in the wavelength conversion element, it is preferable that the crystal holding unit be a substrate (member of substrate form) and the dye molecule crystal aggregate be held on one surface of the substrate. The element having the dye molecule crystal aggregate as the wavelength conversion medium can thereby be configured favorably. Also, in this case, the substrate that is the crystal holding unit may include the reflecting unit that reflects the incident light (signal light and reference light).

In regard to the dye molecule that is to be the wavelength conversion medium, the dye molecule crystals contained in the dye molecule crystal aggregate are preferably crystal grains having a shape with a width of no more than 1 μm and a length of no more than 10 μm. With this configuration, the efficiency of the wavelength conversion utilizing the near-field light in the dye molecule crystal aggregate can be improved.

The present invention can be applied to a signal waveform measuring apparatus and a signal waveform measuring method that enable a time waveform of signal light to be measured with good precision by a simple configuration.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A signal waveform measuring apparatus comprising:
a signal optical system guiding pulsed signal light that is to be subject to measurement of a time waveform;
a reference optical system guiding reference light used in measuring the time waveform of the signal light;
a time difference setting unit disposed at least in one of either the signal optical system or the reference optical system and setting a time difference between the signal light and the reference light;
a wavelength conversion element including an aggregate of crystals of a dye molecule and generating converted light, which has been wavelength-converted to a shorter wavelength than incident light made incident on the dye molecule crystal aggregate, at an intensity proportional to an r-th power (r>1) of the intensity of the incident light;

a photodetecting unit detecting the converted light, which is generated at the wavelength conversion element by the incidence of the signal light from the signal optical system and the reference light from the reference optical system and at the intensity that is in accordance with the intensity of the signal light, the intensity of the reference light, and the time difference between the two; and a signal waveform analyzing unit performing analysis of the converted light detection result at the photodetecting unit and thereby acquiring the time waveform of the signal light.

2. The signal waveform measuring apparatus according to claim 1, wherein each of the signal light and the reference light is light of a wavelength longer than an absorption edge of the dye molecule in the wavelength conversion element.

3. The signal waveform measuring apparatus according to claim 1, wherein the wavelength conversion element generates the converted light at the intensity proportional to the r-th power (r≧2) of the intensity of the incident light.

4. The signal waveform measuring apparatus according to claim 1, wherein the time difference setting unit comprises a delay time control unit disposed in the signal optical system or the reference optical system and variably controlling the delay time of the signal light or the reference light.

5. The signal waveform measuring apparatus according to claim 1, wherein the time difference setting unit comprises a waveform setting unit disposed in the reference optical system with an axis orthogonal to the light guiding direction of the reference light as a time distribution measurement axis and setting the spatial waveform and the time waveform of the reference light in a manner such that the delay time varies along the time distribution measurement axis.

6. The signal waveform measuring apparatus according to claim 1, further comprising a spectroscopic unit, disposed in the signal optical system with an axis orthogonal to the light guiding direction of the signal light as a wavelength distribution measurement axis and spectrally resolving the signal light in a manner such that the wavelength varies along the wavelength distribution measurement axis.

7. The signal waveform measuring apparatus according to claim 1, wherein the photodetecting unit comprises a zero-dimensional photodetector that detects the intensity of the converted light.

8. The signal waveform measuring apparatus according to claim 1, wherein the photodetecting unit comprises a one-dimensional or two-dimensional imaging element that detects the optical image of the converted light.

9. The signal waveform measuring apparatus according to claim 1, further comprising a reference light source that supplies the reference light.

10. The signal waveform measuring apparatus according to claim 1, further comprising a light branching unit that branches a portion of the signal light to generate the reference light.

11. A signal waveform measuring method comprising:

a signal light guiding step of guiding, by a signal optical system, pulsed signal light that is to be subject to measurement of a time waveform;

a reference light guiding step of guiding, by a reference optical system, reference light used in measuring the time waveform of the signal light;

a time difference setting step of setting a time difference between the signal light and the reference light in at least one of either the signal optical system or the reference optical system;

a wavelength conversion step of using a wavelength conversion element, including an aggregate of crystals of a dye molecule, to generate converted light, which has been wavelength-converted to a shorter wavelength than incident light made incident on the dye molecule crystal aggregate, at an intensity proportional to an r-th power (r>1) of the intensity of the incident light;

a photodetecting step of detecting the converted light, which is generated at the wavelength conversion element by the incidence of the signal light from the signal optical system and the reference light from the reference optical system and at the intensity that is in accordance with the intensity of the signal light, the intensity of the reference light, and the time difference between the two; and a signal waveform analyzing step of performing analysis of the converted light detection result at the photodetecting step and thereby acquiring the time waveform of the signal light.

12. The signal waveform measuring method according to claim 11, wherein each of the signal light and the reference light is light of a wavelength longer than an absorption edge of the dye molecule in the wavelength conversion element.

13. The signal waveform measuring method according to claim 11, wherein the wavelength conversion element generates the converted light at the intensity proportional to the r-th power (r≧2) of the intensity of the incident light.

* * * * *